(12) United States Patent
Kim

(10) Patent No.: US 10,876,916 B2
(45) Date of Patent: Dec. 29, 2020

(54) SENSOR ELEMENT

(71) Applicant: HYUNDAI KEFICO CORPORATION, Gunpo (KR)

(72) Inventor: Chi Yeon Kim, Gyeonggi-do (KR)

(73) Assignee: HYUNDAI KEFICO CORPORATION, Gunpo (KR)

( * ) Notice: Subject to any disclaimer, the term of this patent is extended or adjusted under 35 U.S.C. 154(b) by 158 days.

(21) Appl. No.: 15/846,598

(22) Filed: Dec. 19, 2017

(65) Prior Publication Data
US 2018/0180502 A1    Jun. 28, 2018

(30) Foreign Application Priority Data

Dec. 26, 2016  (KR) .................. 10-2016-0179137

(51) Int. Cl.
| | | |
|---|---|---|
| *G01L 9/02* | (2006.01) | |
| *G01L 9/04* | (2006.01) | |
| *G01L 19/04* | (2006.01) | |
| *G01L 9/00* | (2006.01) | |
| *G01L 19/00* | (2006.01) | |
| *G01K 7/16* | (2006.01) | |

(52) U.S. Cl.
CPC ................. *G01L 9/045* (2013.01); *G01K 7/16* (2013.01); *G01L 9/0042* (2013.01); *G01L 9/0054* (2013.01); *G01L 19/0092* (2013.01)

(58) Field of Classification Search
CPC .......... G01L 9/025; G01L 9/045; G01L 19/04
See application file for complete search history.

(56) References Cited

U.S. PATENT DOCUMENTS

| | | | |
|---|---|---|---|
| 2009/0126498 A1* | 5/2009 | Gilch ................... | G01L 9/0055 73/708 |
| 2018/0306664 A1* | 10/2018 | Kim ....................... | G01L 19/06 |

FOREIGN PATENT DOCUMENTS

| | | |
|---|---|---|
| CN | 101163951 A | 4/2008 |
| JP | H-11304617 A | 11/1999 |
| JP | 2004-138425 A | 5/2004 |
| JP | 2015-230242 A | 12/2015 |
| KR | 20120067393 A | 6/2012 |
| KR | 10-1306407 B1 | 9/2013 |
| KR | 10-2013-0140256 A | 12/2013 |

(Continued)

*Primary Examiner* — Herbert K Roberts
(74) *Attorney, Agent, or Firm* — Mintz Levin Cohn Ferris Glovsky and Popeo, P.C.; Peter F. Corless

(57) ABSTRACT

A sensor element that has high measurement precision by providing a resistance-change length ratio corresponding to a direction-specific extension length is provided. The sensor element includes an element body disposed in a sensor body to measure a temperature and a pressure and having a diaphragm deformed based on the temperature or the pressure. Additionally, the sensor element includes pressure-measuring resistors including a second resistor portion and a fourth resistor portion disposed along a diametric direction with respect to a center of an upper surface of the diaphragm and in an extension section on the upper surface of the diaphragm and a first resistor portion and including a third resistor portion disposed outside the second resistor portion or the fourth resistor portion in a compression section on the upper surface of the diaphragm to eliminate a resistance change caused by a pressure-specific temperature change.

5 Claims, 23 Drawing Sheets

(56) References Cited

FOREIGN PATENT DOCUMENTS

| WO | 2016/148531 | A1 | | 9/2016 | | |
| WO | WO-2016148531 | A1 | * | 9/2016 | ............... | G01L 9/00 |

* cited by examiner

FIG. 9

| ANALYTICAL CASE | | APPLIED PRESSURE | DIAMETRIC DIRECTION | | | | | |
|---|---|---|---|---|---|---|---|---|
| | | | D1 | | | | D3 | |
| | | | Z1 | Z2 | DEVIATION | Z3 | Z4 | DEVIATION |
| PRESSURE SENSOR | -40°C | 120bar | -0.00078 | -0.00049 | 0.000292 | -0.00078 | -0.00049 | 0.000292 |
| | | 240bar | -0.00088 | -0.0003 | 0.000585 | -0.00088 | -0.0003 | 0.000585 |
| | | 350bar | -0.00098 | -0.00013 | 0.000852 | -0.00098 | -0.00013 | 0.000852 |
| | +23°C | 120bar | -0.0001 | 0.000191 | 0.000293 | -0.0001 | 0.000191 | 0.000293 |
| | | 240bar | -0.0002 | 0.000381 | 0.000584 | -0.0002 | 0.000381 | 0.000584 |
| | | 350bar | -0.0003 | 0.000556 | 0.000852 | -0.0003 | 0.000556 | 0.000852 |
| | +140°C | 120bar | 0.00117 | 0.001462 | 0.000292 | 0.00117 | 0.001462 | 0.000292 |
| | | 240bar | 0.001068 | 0.001653 | 0.000585 | 0.001068 | 0.001653 | 0.000585 |
| | | 350bar | 0.000975 | 0.001827 | 0.000852 | 0.000975 | 0.001827 | 0.000852 |
| COMPOUND TEMPERATURE AND PRESSURE SENSOR | -40°C | 120bar | -0.00078 | -0.00049 | 0.000291 | -0.00078 | -0.00049 | 0.000291 |
| | | 240bar | -0.00088 | -0.0003 | 0.000584 | -0.00088 | -0.0003 | 0.000584 |
| | | 350bar | -0.00098 | -0.00013 | 0.000851 | -0.00098 | -0.00013 | 0.000851 |
| | +23°C | 120bar | -0.0001 | 0.000191 | 0.000292 | -0.0001 | 0.000191 | 0.000293 |
| | | 240bar | -0.0002 | 0.000381 | 0.000584 | -0.0002 | 0.000381 | 0.000584 |
| | | 350bar | -0.0003 | 0.000556 | 0.000852 | -0.0003 | 0.000556 | 0.000852 |
| | +140°C | 120bar | 0.00117 | 0.001464 | 0.000294 | 0.00117 | 0.001464 | 0.000294 |
| | | 240bar | 0.001069 | 0.001654 | 0.000585 | 0.001069 | 0.001654 | 0.000585 |
| | | 350bar | 0.000976 | 0.001829 | 0.000853 | 0.000976 | 0.001829 | 0.000853 |

FIG. 14A

| ANALYTICAL CASE | | APPLIED PRESSURE | DIAMETRIC DIRECTION(R) | | (AT SAME TEMPERATURE) PRESSURE DEVIATION |
|---|---|---|---|---|---|
| | | | EXTENSION SECTION | COMPRESSION SECTION | |
| PRESSURE SENSOR | −40°C | 120bar | 1000.490 | 1000.782 | 0.195 |
| | | 240bar | 1000.299 | 1000.884 | |
| | | 350bar | 1000.125 | 1000.977 | |
| | +23°C | 120bar | 999.809 | 1000.102 | 0.194 |
| | | 240bar | 999.619 | 1000.203 | |
| | | 350bar | 999.444 | 1000.296 | |
| | +140°C | 120bar | 998.538 | 998.830 | 0.195 |
| | | 240bar | 998.347 | 998.932 | |
| | | 350bar | 998.173 | 999.025 | |
| COMPOUND TEMPERATURE AND PRESSURE SENSOR | −40°C | 120bar | 1000.491 | 1000.782 | 0.195 |
| | | 240bar | 1000.300 | 1000.884 | |
| | | 350bar | 1000.126 | 1000.977 | |
| | +23°C | 120bar | 999.809 | 1000.101 | 0.195 |
| | | 240bar | 999.619 | 1000.203 | |
| | | 350bar | 999.444 | 1000.296 | |
| | +140°C | 120bar | 998.536 | 998.830 | 0.194 |
| | | 240bar | 998.346 | 998.931 | |
| | | 350bar | 998.171 | 999.024 | |

SENSOR ELEMENT

CROSS-REFERENCE TO RELATED APPLICATION

This application claims priority to Korean Patent Application No. 10-2016-0179137, filed on Dec. 26, 2016, the disclosure of which is incorporated herein by reference in its entirety.

TECHNICAL FIELD

The present disclosure relates to a sensor element, and more particularly, to a sensor element that is a sensing device capable of more precisely measuring physical quantities including a temperature and a pressure of a fluid in a vehicle and may be used as a temperature sensor and a pressure sensor.

RELATED ART

Generally, a sensor is an information conversion device that senses and collects a physical quantity and the like of a measurement target and converts the physical quantity into a signal readable by an observer or a device. A sensor includes a sensor element that measures a physical quantity, a circuit portion physically coupled to the sensor element in a circuit, and a housing that protects the sensor element and the circuit. In particular, as a fundamental element of a device that acquires information on a target, the sensor element is required to sensitively react to a physical quantity and to show stable performance despite repetitive loads. A reduction in weight and size of devices that utilize sensors has required technology for mass-producing sensors to thereby reduce volumes or sizes of the sensors.

To acquire information on a physical quantity, precision of a sensor important and a technology for mass-producing the sensor according to shape and structural features is required. For example, when the sensor is configured to more precisely measure different physical quantities in a compound manner, use of a specific component by the sensor is reduced, and thus the weight and volume of the sensor are also reduced. Types of sensors according to related arts include a pressure sensor shown in FIG. 1 and a compound temperature and pressure sensor shown in FIG. 2. The pressure sensor of FIG. 1 includes a pressure sensor element 3 disposed in a sensor body 1. The pressure sensor element 3 has a strain gauge and measures a pressure through the amount of strain and a strain rate of the strain gauge corresponding to a pressure exerted on an open hollow portion of the sensor body 1. The compound temperature and pressure sensor of FIG. 2 separately has a temperature sensor element 2a disposed in a compound temperature and pressure sensor body 2 in addition to a pressure sensor element 3. For example, the pressure sensor element 3 of the compound temperature and pressure sensor are the same as that installed in the pressure sensor of FIG. 1.

Each of the pressure sensor elements 3 has a diaphragm on an upper surface thereof, and pressure-measuring resistors for a strain gauge are installed on a circular surface of the diaphragm. Accordingly, a pressure is measured by sensing a resistance change caused by a change in length and area of each pressure-measuring resistor. However, a resistance change of a pressure sensor element is caused by a pressure change, and a resistance change that includes a strain rate change caused by a pressure-specific temperature change also occurs. A change in strain rate or resistance is affected by a temperature change.

As a result, a sensor in which the pressure sensor element according to the related arts is installed has a disadvantage since a high resolution due to an influence of a temperature change when measuring a pressure without temperature compensation cannot be shown. For example, the resolution is a value that represents how many fragments the sensor has a capability of dividing a signal into for measuring. In other words, the resolution of the sensor may be performance related to how precisely it is possible to measure and analyze a load (e.g., a physical quantity). Additionally, ac an additional temperature compensation module in a circuit of the sensor to compensate for temperature is required. However, when a temperature dramatically changes, a difference may occur between a temperature value of the additional temperature compensation module and a temperature value resulting from a change in strain rate (e.g., a resistance change), and an output error may be generated by the sensor.

Accordingly, research has been conducted to make use of the disadvantage of a resistance change being caused by temperature, as a temperature sensor, a pressure sensor element and a pressure sensor together. However, when a change in resistance or strain rate of the pressure sensor element is used as a temperature change to implement the function of a temperature sensor, precision or resolution is considerably degraded due to non-linearity of a measured temperature value. Therefore, it is difficult to use the pressure sensor elements as a high-performance vehicular sensor.

The above information disclosed in this section is merely for enhancement of understanding of the background of the disclosure and therefore it may contain information that does not form the prior art that is already known in this country to a person of ordinary skill in the art.

SUMMARY

The present disclosure provides a sensor element in which some of temperature-measuring resistors or pressure-measuring resistors provided in a compression section of an element body (e.g., one or two pressure-measuring resistors in the compression section) separately from an existing pressure-measuring resistor are configured to individually have resistance-change length ratios that correspond to direction-specific extension lengths. Accordingly, a resistance change (e.g., a temperature deviation) caused by a pressure-specific temperature change may be eliminated and a measured temperature value may achieve linearity and may be used as a pressure sensor and a temperature sensor due to relatively high measurement precision.

According to an aspect of the present disclosure, a sensor element may include an element body disposed in a sensor body configured to measure a temperature and a pressure and having a diaphragm deformed based on the temperature or the pressure and pressure-measuring resistors including a second resistor portion and a fourth resistor portion disposed along a diametric direction with respect to a center of an upper surface of the diaphragm and in an extension section on the upper surface of the diaphragm and including a first resistor portion and a third resistor portion disposed outside the second resistor portion or the fourth resistor portion in a compression section on the upper surface of the diaphragm to eliminate a resistance change caused by a pressure-specific temperature change.

In some exemplary embodiments, the element body may include a hollow portion opened at a central part of a lower surface of the element body configured to receive a pressure that is applied, a step formed on a circumferential surface of a cylindrical wall that limits the hollow portion and the diaphragm integrally formed with the cylindrical wall to close an upper end of the cylindrical wall. Additionally, the element body may include the extension section formed on the upper surface of the diaphragm with respect to the center and extending along a circumferential direction of the diaphragm between the center and a compression start boundary at which a strain of the diaphragm in a diametric direction is configured to be changed (e.g., switched) from an extension state to a compression state. the compression section that is a circular band region disposed outside the extension section on the upper surface of the diaphragm and extending along the circumferential direction between the compression start boundary and a compression end boundary at which a strain of the diaphragm in the diametric direction is configured to be changed (e.g., switched) from the compression state to a strainless state and a circumferential section disposed between the compression section and an outside of the diaphragm, and a maximum compression boundary may be formed along the circumferential direction between the compression end boundary and the compression start boundary.

In other exemplary embodiments, the element body may include a temperature-measuring resistor formed in the compression section on the upper surface of the diaphragm, a strain of the pressure-measuring resistors may increase due to a temperature increase of the diaphragm to reduce a resistance value of the pressure-measuring resistors, and the temperature-measuring resistor may be configured to perform a temperature compensation to maintain the resistance value independent of the pressure. The temperature-measuring resistor may have a resistor pattern that corresponds to a resistance-change length ratio to enable the temperature-measuring resistor to react to temperature through offsetting of a resistance change caused by a pressure change.

Additionally, the resistor pattern of the temperature-measuring resistor may include a first extension that extends by a first extension length along the diametric direction from a pattern start point in the compression section on the upper surface of the diaphragm to the maximum compression boundary, a second extension that is bent along the circumferential direction at an end of the first extension and then extends by a second extension length along the maximum compression boundary and a third extension that extends by a third extension length along the diametric direction from an end of the second extension to a pattern end point.

In other exemplary embodiments, the resistance-change length ratio of the temperature-measuring resistor may be a ratio that makes the second extension length equal to a product of a resistance-change offset multiple and a sum of the first extension length and the third extension length and may be derived from an analytical experiment to determine a correlation between a pressure change and strain rate changes in the diameter direction and circumferential direction in the diaphragm to offset an amount of compressive strain in the diametric direction and an amount of tensile strain in the circumferential direction with each other and sum to zero. The resistor pattern of the temperature-measuring resistor may have an arc shape or a straight line shape.

Further, the element body may be selected from a group consisting of a metallic material, an alloy material, a semiconductor material that varies in resistance when a load of temperature or pressure which is a stress applied through a piezoresistive effect, or a composite material obtained by combining the semiconductor material with the metallic material or the alloy material.

In some exemplary embodiments, the pressure-measuring resistors may include a plurality of connection lead terminals disposed on the upper surface of the diaphragm for electrical connection of the first to fourth resistor portions. The first resistor portion and the third resistor portion of the pressure-measuring resistors may include a plurality of arcs individually disposed along a circumferential direction of the diaphragm and a plurality of straight lines disposed along a diametric direction of the diaphragm. Additionally, a sum of lengths of the plurality of arcs may be equal to a product of a resistance-change offset multiple and a sum of lengths of the plurality of straight lines. The resistance-change offset multiple may be a value calculated to offset a sum of a compressive strain amount in the diametric direction and a tensile strain amount in the circumferential direction with each other and sum to zero. Accordingly, the first resistor portion and the third resistor portion disposed in the compression section on the upper surface of the diaphragm may have an arc shape or a straight line shape.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 9 is an exemplary data table showing results of extracting strain rates according to temperature and pressure from pressure-measuring resistors of the sensor element shown in FIG. 4 according to an exemplary embodiment of the present disclosure;

FIGS. 14A to 14B is an exemplary data table showing results of extracting resistance values according to direction from a diaphragm of a sensor element in order to describe a resistance-change length ratio according to an exemplary embodiment of the present disclosure;

DETAILED DESCRIPTION

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Advantages and features of the present disclosure and a method of achieving the same should be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the disclosure to those of ordinary skill in the art to which the present disclosure pertains. The present disclosure is defined by the claims.

Meanwhile, terminology used herein is for the purpose of describing the embodiments and is not intended to be limiting to the disclosure. As used herein, the singular form of a word "a", "an" and "the" are intended to include the plural form unless clearly indicated otherwise by context. The term "comprise" and/or "comprising," when used herein, does not preclude the presence or addition of one or more components, steps, operations, and/or elements other than the stated components, steps, operations, and/or elements. As used herein, the term "and/or" includes any and all combinations of one or more of the associated listed items. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Figure 1:
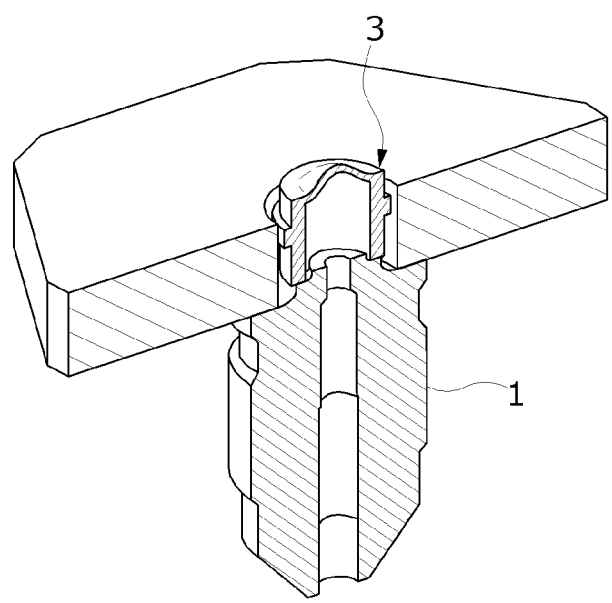
FIG. 1 is an exemplary perspective view showing a cross-section of a pressure sensor having a sensor element according to a related art.
Figure 2:
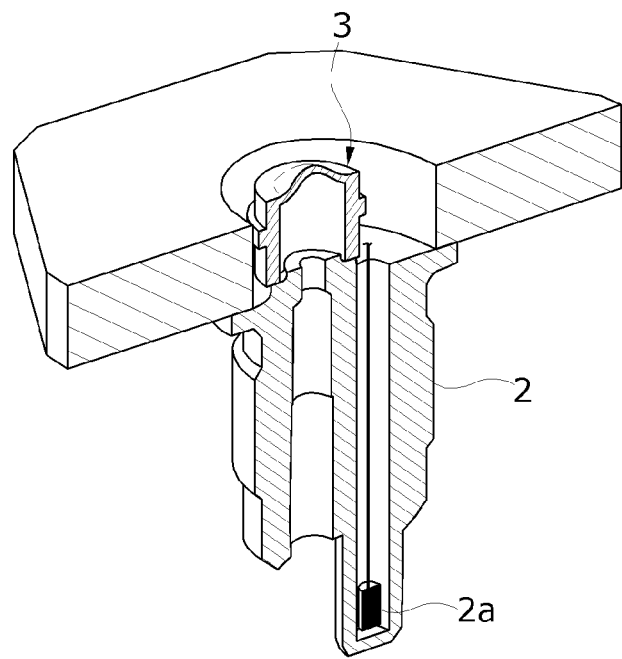
FIG. 2 is an exemplary perspective view showing a cross-section of a compound temperature and pressure sensor according to another related art.
Figure 3:
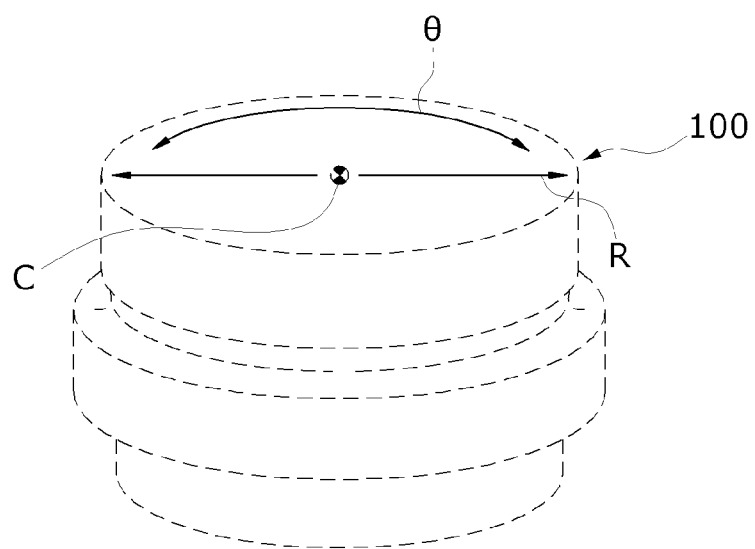
FIG. 3 is an exemplary perspective view for defining directions of a sensor element described in an exemplary embodiment of the present disclosure.
Figure 4:
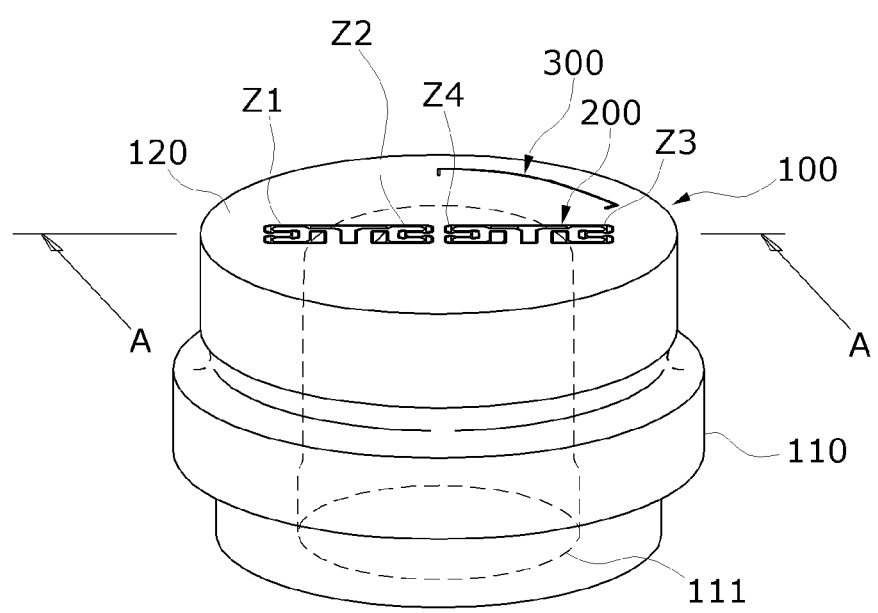
FIG. 4 is an exemplary perspective view of a sensor element according to an exemplary embodiment of the present disclosure.
Figure 5:
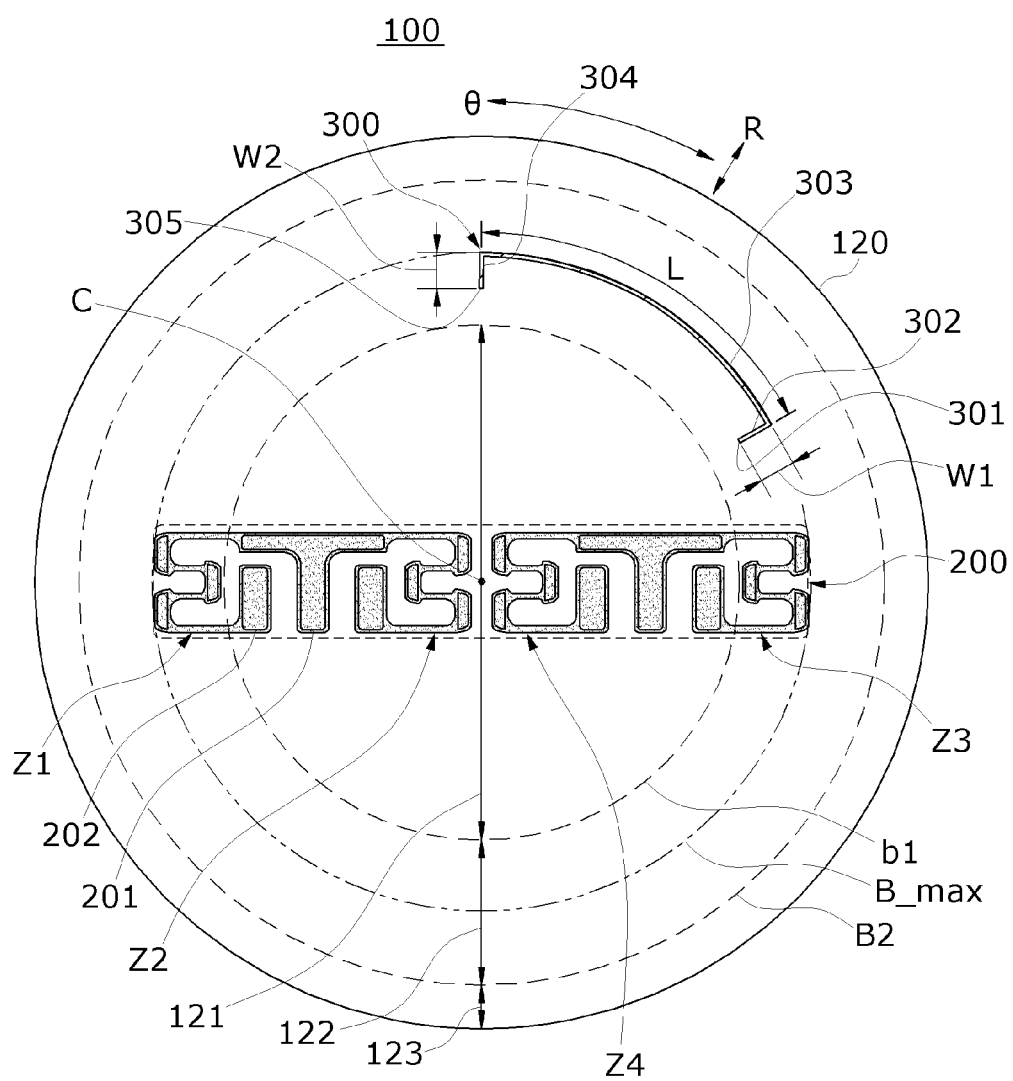
FIG. 5 is an exemplary top-down view of a diaphragm of the sensor element shown in FIG. 4 according to an exemplary embodiment of the present disclosure.
Figure 6:
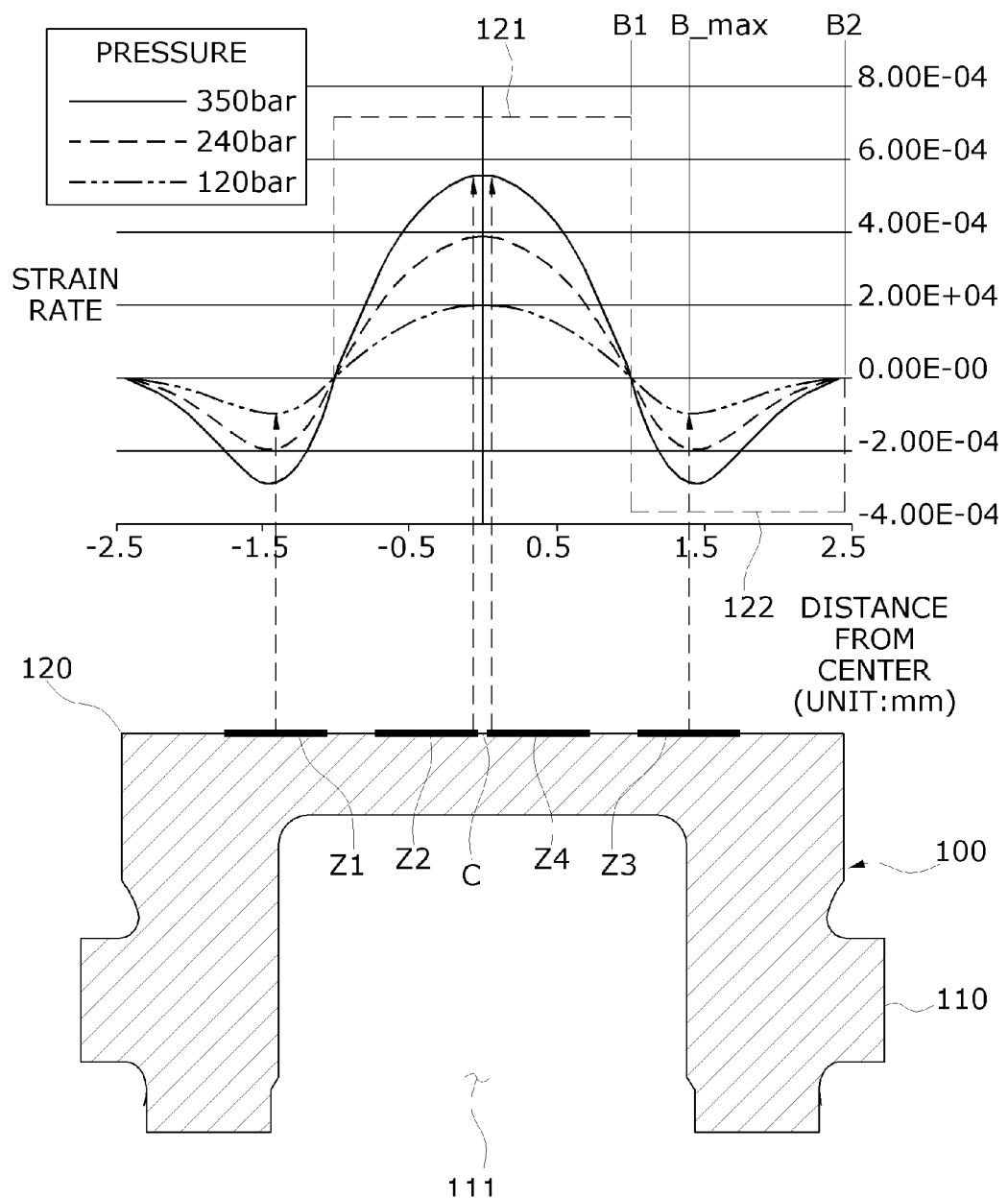
FIG. 6 is an exemplary diagram showing a cross-section of an element body taken along line A-A shown in FIG. 4, and an extension section and a compression section of a strain rate according to an arrangement of resistors according to an exemplary embodiment of the present disclosure.

FIG. 3 is an exemplary perspective view for defining directions of a sensor element described in the present disclosure. FIG. 4 is an exemplary perspective view of a sensor element according to an exemplary embodiment of the present disclosure. FIG. 5 is an exemplary top-down view of a diaphragm of the sensor element shown in FIG. 4. FIG. 6 is an exemplary diagram showing a cross-section of an element body taken along line A-A shown in FIG. 4 and an extension section and a compression section of a strain rate according to an arrangement of resistors.

First, referring to FIG. 3, a diametric direction R denotes a direction in which a strain may be made along a straight line that corresponds to a radius or a diameter that passes through a center C of an upper surface of a diaphragm, which is an upper end of an element body 100 that corresponds to a sensor element, in an exemplary embodiment. Additionally, a circumferential direction θ may be a direction in which a strain is made along a curve corresponding to an arc or a circumference with respect to the center C of the upper surface of the diaphragm.

Referring to FIGS. 3 and 4, the exemplary embodiment may be configured to measure a plurality of physical quantities, including temperature and pressure, and may be a sensor device part of a temperature sensor or of a compound temperature and pressure sensor that is installed and used in a vehicle. The exemplary embodiment may include a sensor element disposed in the sensor body 1 and configured to measure temperature and pressure. The exemplary embodiment described below may include the element body 100 and pressure-measuring resistors 200. The exemplary embodiment may further include a temperature-measuring resistor 300. To measure a temperature and a pressure of an environment in which the sensor is installed, the element body 100 may include a diaphragm 120 that is deformed based on temperature and pressure.

The element body 100 may have any one material selected from among various materials. For example, the element body 100 may be manufactured with a metallic material or an alloy material, a semiconductor material that varies in resistance when a load of temperature or pressure which is a stress is applied through the piezoresistive effect, or a composite material obtained by combining the semiconductor material with the metallic material or the alloy material. Since a material of the element body 100 may be a device material of a general pressure sensor or a compound temperature and pressure sensor of a car, the material may not be limited to a specific material in the present embodiment. The element body 100 may be manufactured with a general-use material that is used to manufacture the aforementioned pressure sensor or compound temperature and pressure sensor. The element body 100 may include a hollow portion 111 that is open at a central part of a lower surface of the element body 100 that has a pressure is applied thereto, a step 110 formed on a circumferential surface of a cylindrical wall that limits the hollow portion 111, and the diaphragm 120 integrally formed with the cylindrical wall to close an upper end of the cylindrical wall.

The step 110 may correspond to a portion protruding from the outer side of the hollow portion 111 and may prevent by reinforcing structural rigidity of the circumferential surface of the element body 100 strain caused by pressure. In other words, due to the step 110 and the cylindrical wall the circumferential surface of the element body 100 or a portion that corresponds to a circumferential section of the diaphragm 120, which will be described below, may be a rigid body that is not deformed by stress from pressure.

Referring to FIGS. 5 and 6, the pressure-measuring resistors 200 may include a first resistor portion Z1, a second resistor portion Z2, a fourth resistor portion Z4, and a third resistor portion Z3. The first resistor portion Z1, the second resistor portion Z2, the fourth resistor portion Z4, and the third resistor portion Z3 may be resistors in the form of semiconductor resistor chips. The pressure-measuring resistors 200 may be implemented using the principle of the Wheatstone bridge circuit in which divided voltages are measured at the individual resistors Z1, Z2, Z3, and Z4 using a resistance change caused by extension or compression according to an arrangement thereof.

In particular, with respect to the diametric direction R, a maximum strain rate may be shown at the center C of the upper surface of the diaphragm 120. For example, a strain rate of a positive value may denote extension, and a strain rate of a negative value may denote compression. At high temperature, extension (e.g., a strain rate of a positive value) may occur in a compression section 122 as well as an extension section 121, which will be described below. The upper surface of the diaphragm 120 may include the extension section 121 formed with respect to the center C, the compression section 122 disposed outside the extension section 121, and a circumferential section 123 disposed between the compression section 122 and the outside of the diaphragm 120. In other words, the extension section 121 may indicate a central region that extends along the circumferential direction θ between the center C and a compression start boundary B1 at which a strain of the diaphragm 120 in the diametric direction R is switched from an extension state to a compression state.

The compression section 122 may be disposed outside the extension section 121 on the upper surface of the diaphragm 120. In other words, the compression section 122 may indicate a circular band region that extends along the circumferential direction θ between the compression start boundary B1 and a compression end boundary B2. For example, the compression end boundary B2 may indicate a position at which a strain of the diaphragm 120 in the diametric direction R is switched from the compression state to a strainless state.

A maximum compression boundary B_max may be formed along the circumferential direction θ between the compression start boundary B1 and the compression end boundary B2. For example, the maximum compression boundary B_max may be defined on the basis of an average calculated by dividing the sum of values at points on the compression start boundary B1 and the compression end boundary B2. The circumferential section 123 may be a region outside the compression end boundary B2 and may be a rigid body region in which stress from pressure is minimized For example, the center C, the compression start boundary B1, the maximum compression boundary B_max, and the compression end boundary B2 may not be visible physically as the structure of FIG. 4 on the upper surface of the diaphragm 120. The pressure-measuring resistors 200 may be disposed along the diametric direction R with respect to the center C of the upper surface. The pressure-measuring resistors 200 may include the first resistor portion Z1, the second resistor portion Z2, the fourth resistor portion Z4, and the third resistor portion Z3. The first resistor portion Z1, the second resistor portion Z2, the fourth resistor portion Z4, and the third resistor portion Z3 may be disposed symmetrically with respect to the center C. For example, the second resistor portion Z2 and the fourth resistor portion Z4 may correspond to interior pressure-measuring resistors among the pressure-measuring resistors 200 and may be symmetrically disposed in an interior with respect to the center C, (e.g., proximate to the center C) in the extension section 121 on the upper surface of the diaphragm 120.

The first resistor portion Z1 and the third resistor portion Z3 corresponding to outer pressure-measuring resistors among the pressure-measuring resistors 200 may be disposed in the compression section 122 on the upper surface of the diaphragm 120 with respect to the outside of the second resistor portion Z2 and the fourth resistor portion Z4 to eliminate (e.g., reduce) a resistance change caused by a pressure-specific temperature change. For electrical connection of the first to fourth resistor portions Z1 to Z4, the pressure-measuring resistors 200 may include a plurality of connection lead terminals 201 and 202 disposed on the upper surface of the diaphragm 120.

For example, the first resistor portion Z1 may be electrically connected to a connection lead terminal 201 on a first side and a connection lead terminal 202 may be connected on a second side to extend from an upper left portion of the connection lead terminal 202 on the first side to a lower left portion of the "I" shape of the connection lead terminal 201 on the second side. The first resistor portion Z1 may denote a resistance line that extends in a bent shape between the connection lead terminals 201 and 202. In the same or similar manner, the second resistor portion Z2 to the fourth resistor portion Z4 may have a resistance line form or a resistor pattern.

A sensor controller (not shown) related to the exemplary embodiment may be configured in an electronic circuit to receive an output signal from the temperature-measuring resistor 300 and perform a temperature-sensing control. When the output signal of the temperature-measuring resistor 300 is not used, the sensor controller related to the exemplary embodiment may be configured in an electronic circuit to receive an output signal from some of the pressure-measuring resistors 200 (e.g., the third resistor portion Z3 alone or both of the first resistor portion Z1 and the third resistor portion Z3) and perform a temperature-sensing control.

For example, the first resistor portion Z1 and the third resistor portion Z3, which are the outer pressure-measuring resistors among the pressure-measuring resistors 200, are included in the pressure-measuring resistors 200 but may function as temperature sensors based on the sensor controller as will be described below with reference to FIGS. 10A to 10C. When the temperature-measuring resistor 300 is configured as a temperature sensor the first resistor portion Z1 to the fourth resistor portion Z4 of the pressure-measuring resistors 200 may function as a pressure sensor.

The element body 100 may include the temperature-measuring resistor 300 formed in the compression section on the upper surface of the diaphragm 120. A strain of the pressure-measuring resistors 200 of the diaphragm 120 may be increased due to a temperature increase of the diaphragm 120 to reduce a resistance value of the pressure-measuring resistors 200. The temperature-measuring resistor 300 may be configured to perform a temperature compensation to maintain the resistance value independent of pressure. In other words, the temperature-measuring resistor 300 may assist the pressure-measuring resistors 200 to more rapidly and more accurately output an actual temperature and pressure.

The temperature-measuring resistor 300 may include a resistor pattern that corresponds to a resistance-change length ratio to enable the temperature-measuring resistor 300 to react to temperature through offsetting of resistance changes caused by a temperature change. For example, the offsetting of resistance changes caused by a temperature change may occur in the compression section 122 of the diaphragm 120 when a length of the temperature-measuring resistor 300 locally extends in the circumferential direction θ in relation to the diametric direction R.

For example, the resistor pattern of the temperature-measuring resistor 300 may include a first extension 302 that extends by a first extension length W1 along the diametric direction R of the diaphragm 120 from a pattern start point 301 in the compression section 122 on the upper surface of the diaphragm 120 to the maximum compression boundary B_max, a second extension 303 that is bent along the circumferential direction θ at an end of the first extension 302 and then extends by a second extension length L along the maximum compression boundary B_max, and a third extension 304 that extends by a third extension length W2 along the diametric direction R from an end of the second extension 303 to a pattern end point 305. In particular, the pattern end point 305 may be disposed in the compression section 122 on the upper surface of the diaphragm 120. The pattern start point 301 and the pattern end point 305 may refer to connection lead terminals for the temperature-measuring resistor 300 for electrically connecting the temperature-measuring resistor 300 to the sensor controller (not shown).

The first extension length W1 and the third extension length W3 may be the same or substantially similar. For example, the second extension 303 of the temperature-measuring resistor 300 may denote an arc-shaped resistor on the maximum compression boundary B_max. The first extension 302 and the third extension 304 may denote resistors or resistance lines in the form of straight lines integrally connected to both ends of the second extension 303.

A resistance-change length ratio of the temperature-measuring resistor 300 may denote a ratio that equalizes the second extension length L of the temperature-measuring resistor 300 in the circumferential direction θ with a product of a resistance-change offset multiple and the sum (W1+W2) of the first extension length W1 and the third extension length W2. For example, the resistance-change offset multiple may be a value derived from an analytical experiment to offset the amount of compressive strain in the diametric direction R and the amount of tensile strain in the circumferential direction θ with each other and sum to zero.

In the exemplary embodiment, to calculate the resistance-change offset multiple an analytical experiment to determine a correlation between a pressure change and direction-specific (e.g., the diametric direction and the circumferential direction) strain rate changes in the diaphragm 120 of the element body 100 has been performed as shown in FIGS. 7A to 7C and FIGS. 14A to 14B. For example, the experiment may be a computer-based correlation analysis. As a result of the analytical experiment, the resistance-change offset multiple may be 5.13. For example, the resistance-change offset multiple of 5.13 is calculated as the reciprocal of −5.13158 (e.g., rounded off to the second digit after the decimal point) that is a value calculated by dividing 0.195, which is a value M3 of a compression deviation G4 of the diametric direction R, by −0.038, which is a value N3 of a compression deviation G1 of the circumferential direction θ, under the same temperature condition.

Figure 14B:
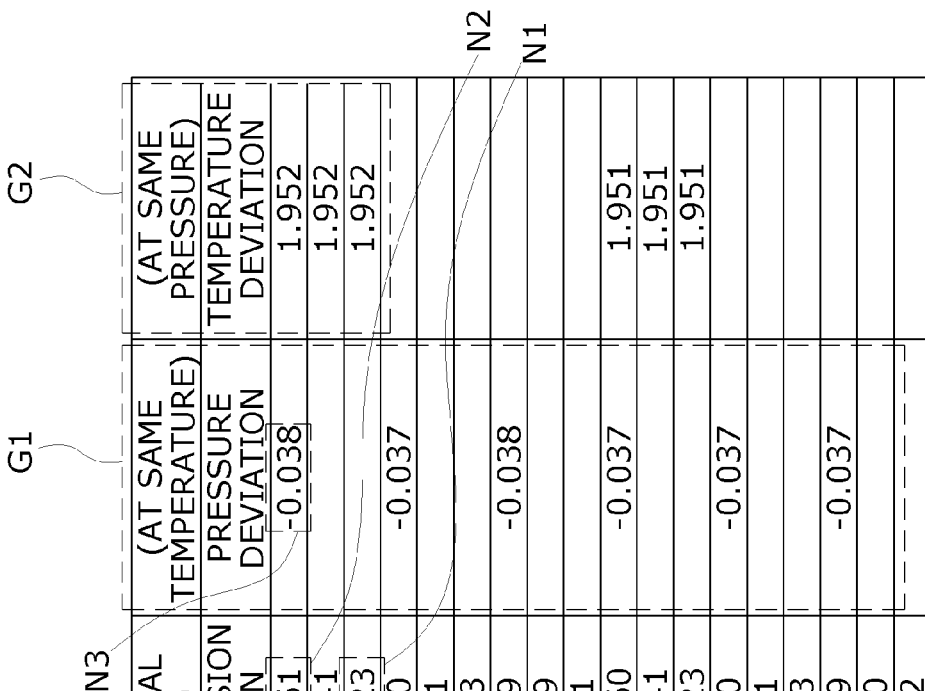

Since a temperature condition or a pressure condition applied to the diaphragm 120 may vary as shown in FIGS. 14A to 14B, the resistance-change offset multiple may be any one value selected from a range between 5.1 and 5.3. For example, the effect of the resistance-change offsetting does not occur above or below the value or value range of the resistance-change offset multiple and occurs within the value or value range. Accordingly, the resistance-change offset multiple provides a threshold.

When a sensor element designer determines the sum (W1+W2) of the first extension length W1 and the third extension length W2 of the temperature-measuring resistor 300 as a specific value and more easily calculate the second extension length L of the temperature-measuring resistor 300 by multiplying the specific value and the resistance-change offset multiple, a time required for mass-producing sensor elements of various standards may be reduced. In the sensor element of the exemplary embodiment, a resistance change (e.g., temperature deviations) caused by a pressure-specific temperature change through a temperature compensation of the temperature-measuring resistor 300 may be eliminated. Therefore, the sensor element of the exemplary embodiment may make it possible to achieve linearity of a measured temperature value and manufacture a precise sensor with a high resolution.

Even when the first resistor portion Z1 or the third resistor portion Z3 disposed in the compression section 122 among the pressure-measuring resistors 200 is designed and manufactured in in a similar manner as that of the design principle of the temperature-measuring resistor 300 in which the resistance-change offset multiple or the resistance-change length ratio is taken into consideration and the temperature-measuring resistor 300 is removed or omitted from the diaphragm 120, the first resistor portion Z1 or the third resistor portion Z3 perform a temperature compensation to more accurately measure a temperature and pressure m by the pressure-measuring resistors 200. In other words, the first resistor portion Z1 or the third resistor portion Z3 disposed in the compression section 122 of the diaphragm 120 may eliminate a resistance change caused by a pressure-specific temperature change by performing a temperature compensation. Accordingly, the sensor element of the exemplary embodiment may achieve linearity of a measured temperature value and manufacture a precise sensor with an improved resolution.

Results of an analytical experiment for finding a correlation between a pressure change and direction-specific (e.g., the diametric direction and the circumferential direction) strain rate changes in the diaphragm 120 of the element body 100 will be described below with reference to FIGS. 7A to 7C and FIGS. 14A to 14B.

Figure 7A:
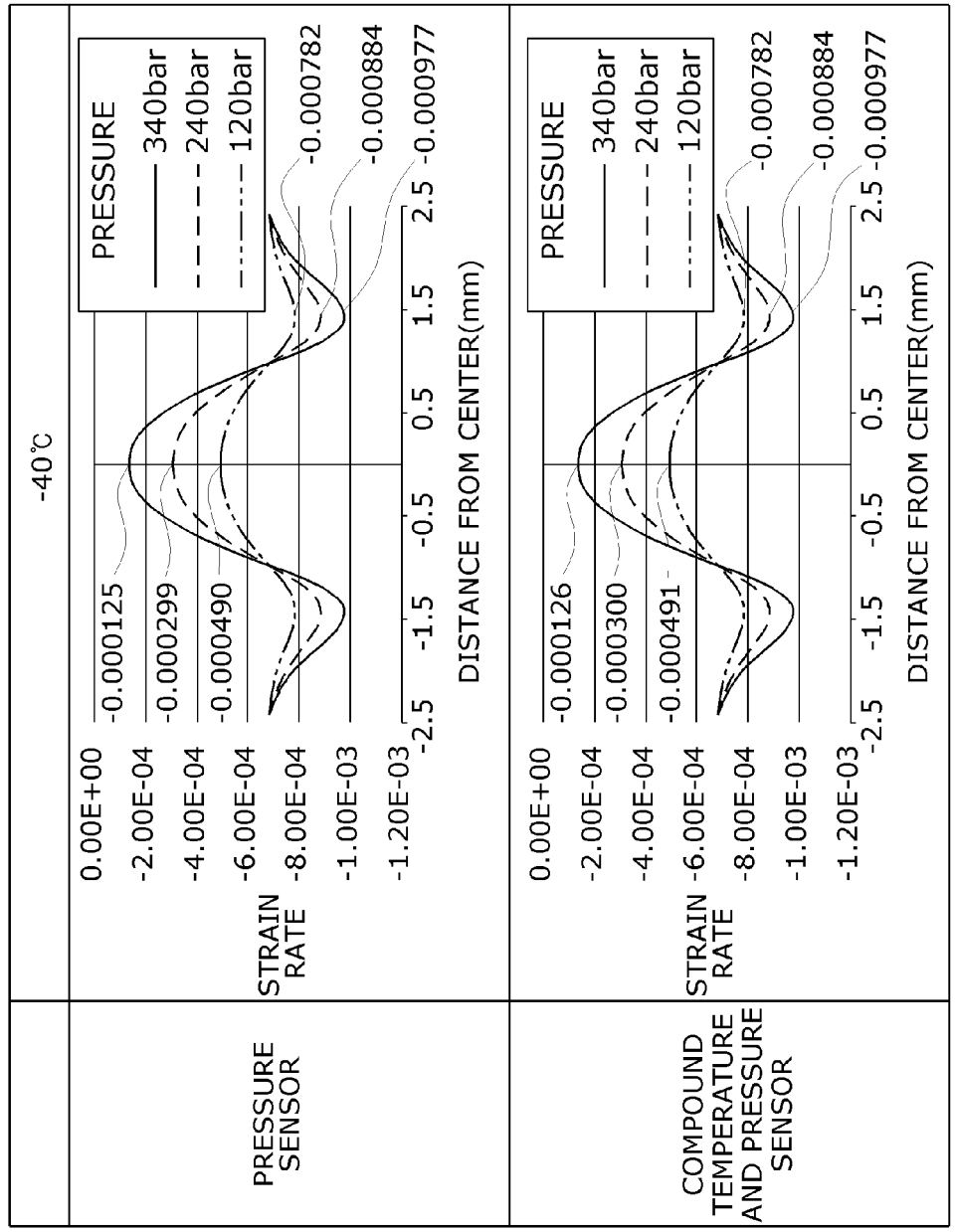
FIGS. 7A to 7C are exemplary graphs showing diametric-direction strain rates of a pressure sensor and a compound temperature and pressure sensor in which the sensor element shown in FIG. 4 is installed according to an exemplary embodiment of the present disclosure.
Figure 7B:
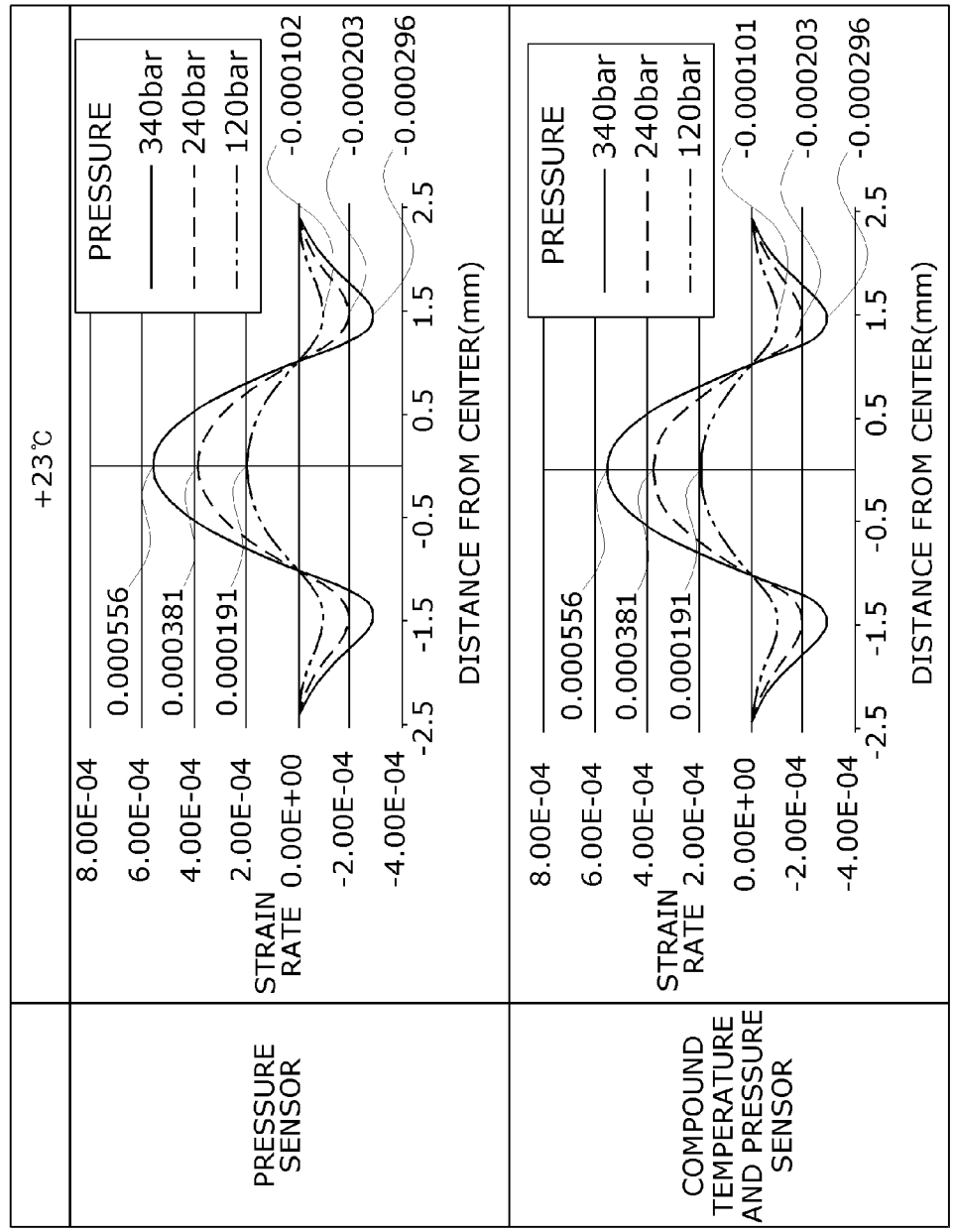
Figure 7C:
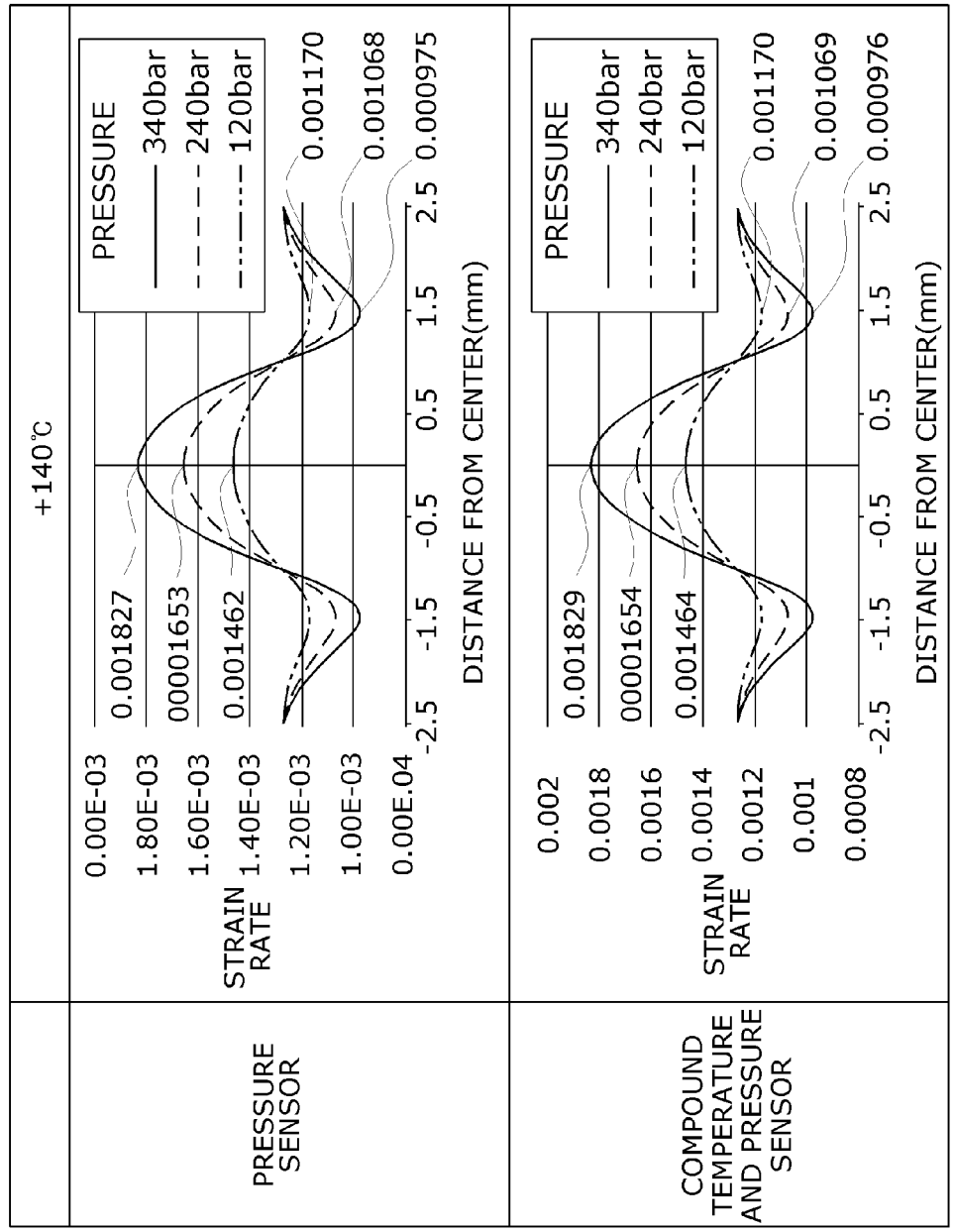

FIGS. 7A to 7C are exemplary graphs showing diameter-direction strain rates of a pressure sensor and a compound temperature and pressure sensor in which the sensor element shown in FIG. 4 is installed. Referring to FIGS. 7A to 7C, according to the analytical experiment of the exemplary embodiment, a maximum strain rate in the diametric direction R is exhibited at the center of the diaphragm as seen from the individual graphs showing distance from the center (in millimeter units) based on temperature and pressure. In particular, an increase in pressure under each temperature condition increase a maximum strain rate of the upper surface of the diaphragm in the diametric direction R and a minimum strain rate decreases. Due to thermal strain, overall strain rate values are reduced at low temperature and increased at high temperature, however, deviations of minimum and maximum values are the same at every temperature.

Figure 8A:
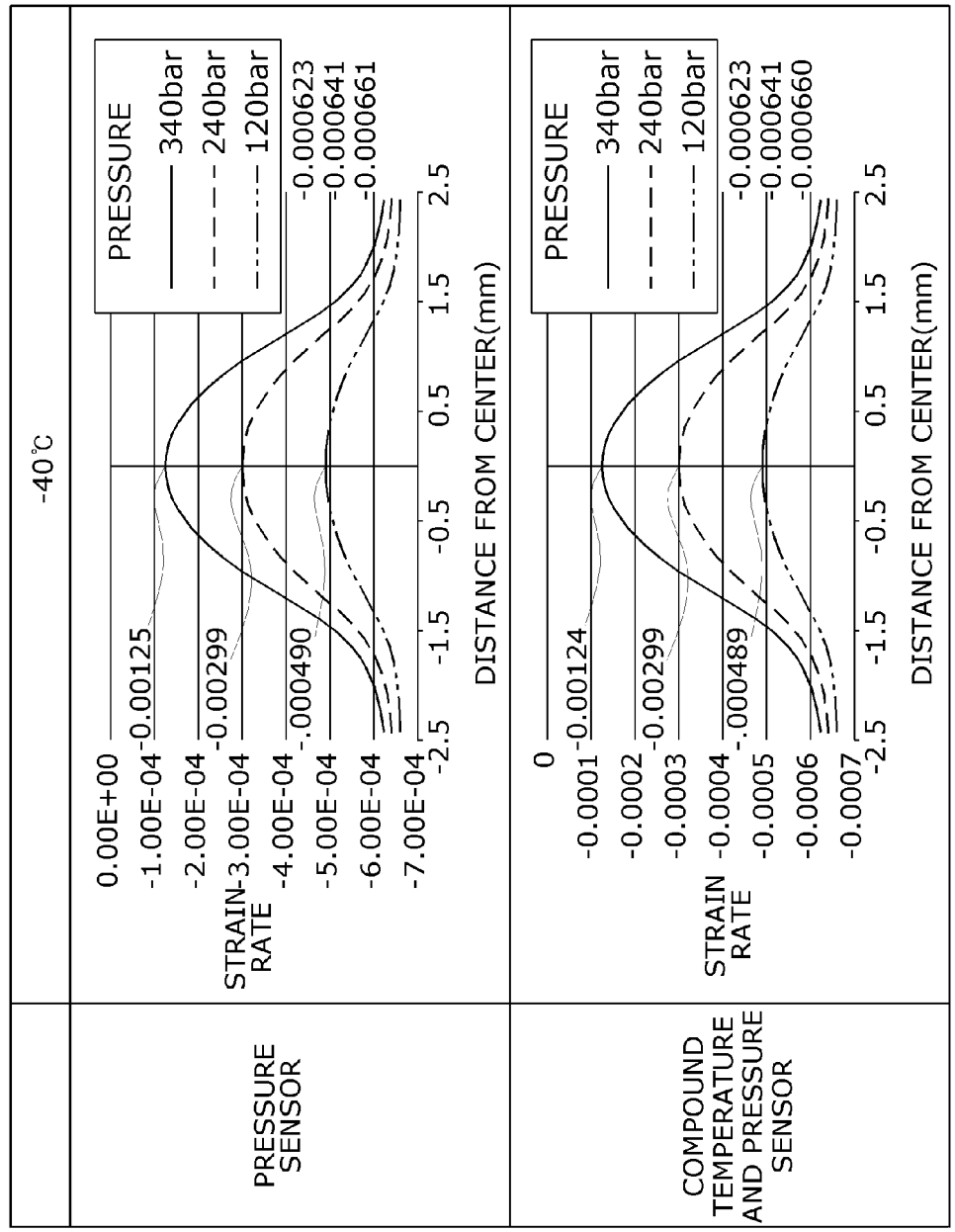
FIGS. 8A to 8C are exemplary graphs showing circumferential-direction strain rates of a pressure sensor and a compound temperature and pressure sensor in which the sensor element shown in FIG. 4 is installed according to an exemplary embodiment of the present disclosure.
Figure 8B:
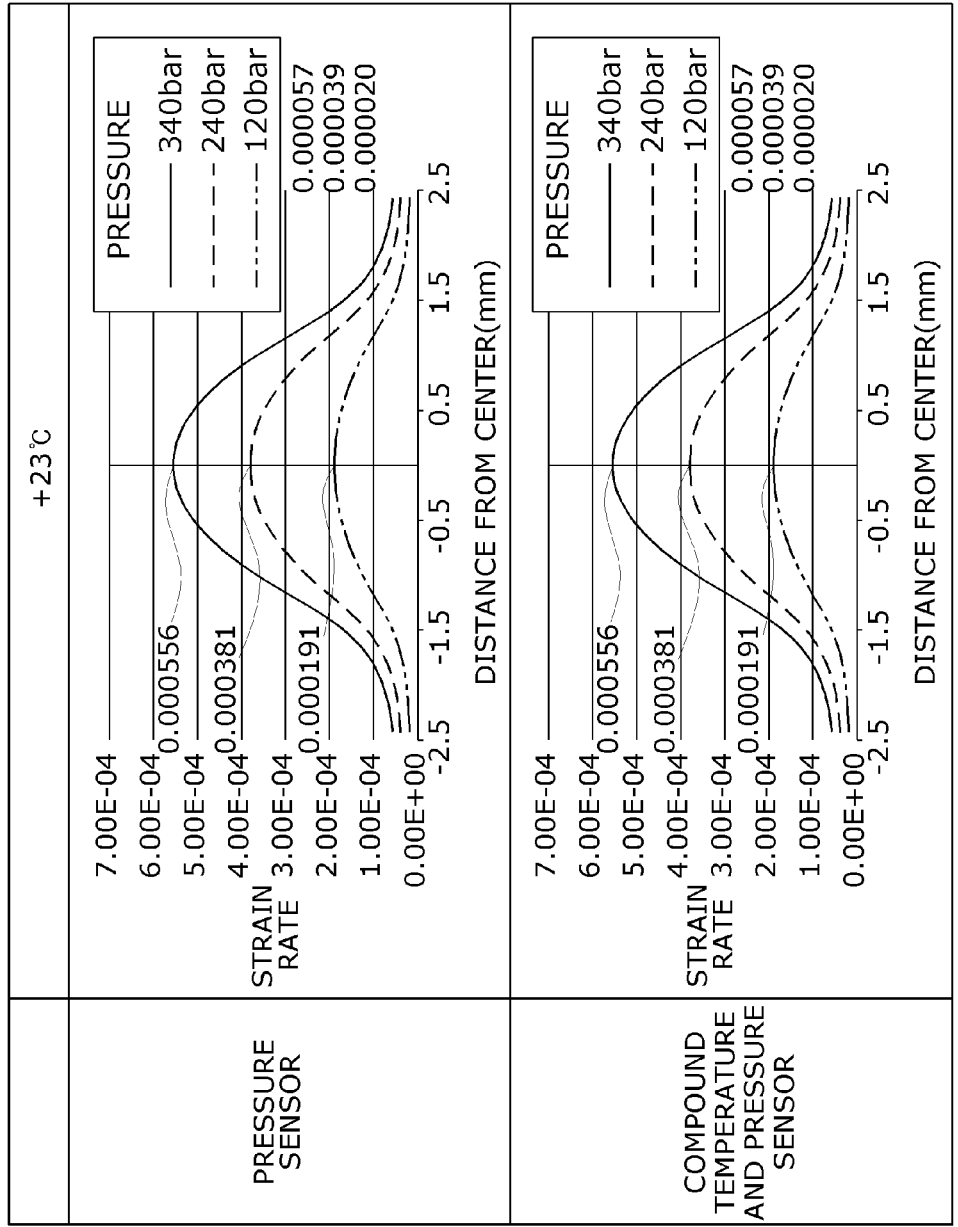
Figure 8C:
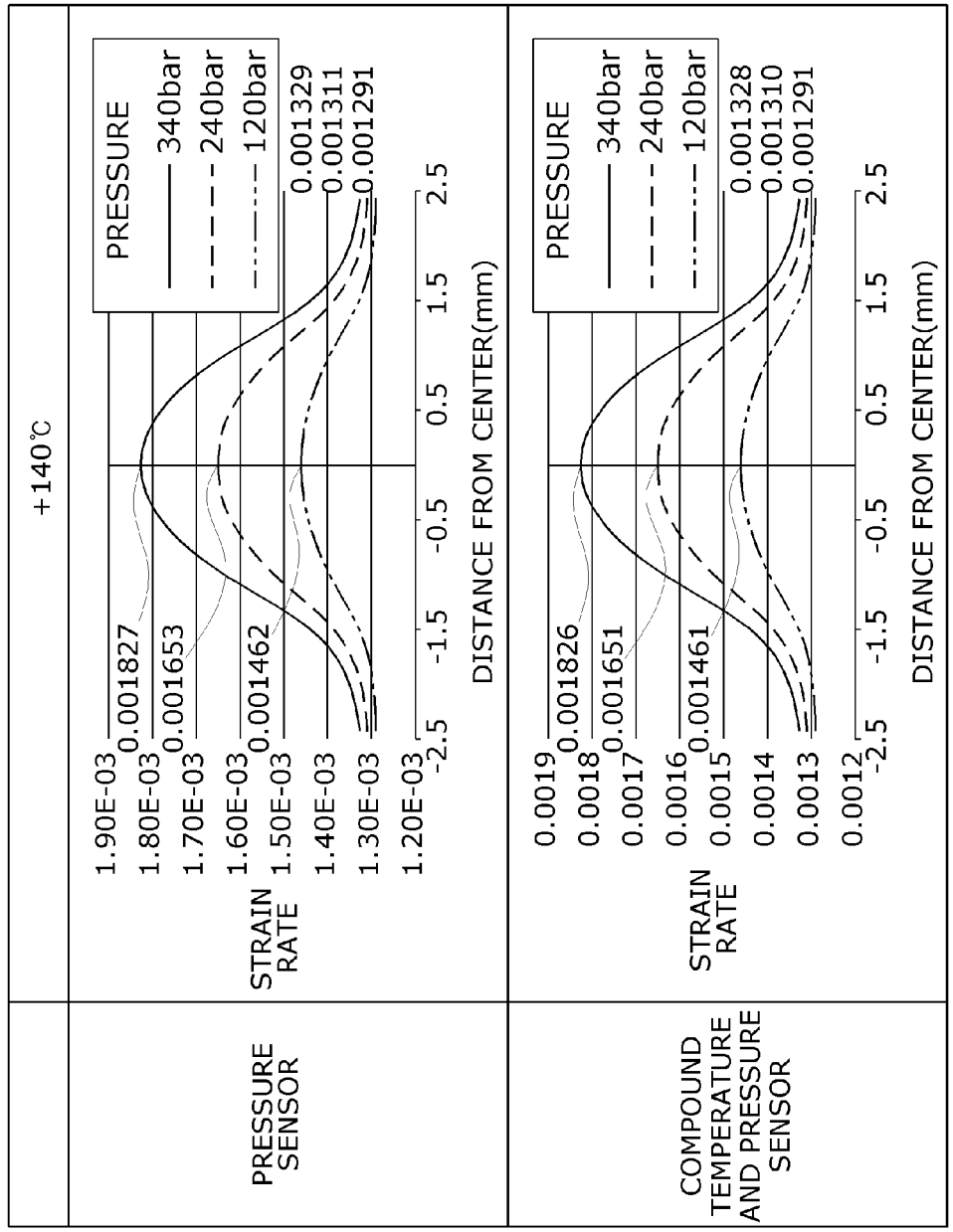

FIGS. 8A to 8C are exemplary graphs showing circumferential-direction strain rates of a pressure sensor and a compound temperature and pressure sensor in which the sensor element shown in FIG. 4 is installed. Referring to FIGS. 8A to 8C, a maximum strain rate in the circumferential direction θ may be shown at the center of the diaphragm, and a strain rate in the circumferential direction θ may decrease toward the edge of the diaphragm. Similar to a strain rate in the diametric direction R described above with reference to FIGS. 7A to 7C, deviations of minimum and maximum values may be the same at every temperature.

As shown in the analytical experiment, when strain rates of the circumferential direction θ are extracted, a maximum strain rate has a deviation of 0.000002 or less and a minimum strain rate has a deviation of 0.000001 or less. The deviations of the maximum and minimum strain rates are minimized (e.g., very small) and are within an analytical margin of error.

FIG. 9 is an exemplary data table showing results of extracting strain rates according to temperature and pressure from pressure-measuring resistors of the sensor element shown in FIG. 4. Referring to extracted strain rate data according to sensor product type (e.g., the pressure sensor or the compound temperature and pressure sensor), temperature, and pressure, the first resistor portion Z1 and the third resistor portion Z3 that are symmetrical to each other may have the same values, and the second resistor portion Z2 and the fourth resistor portion Z4 that are symmetrical to each other may have the same values. For example, when strain rate values in a data column D1 of the first resistor portion Z1 are compared with strain rate values in a data column D3 of the third resistor portion Z3, they may be individually identical to each other. In other words, one or two resistors (Z1 and/or Z3) of pressure-measuring resistors may be disposed in the compression section of the diaphragm. Therefore, the first resistor portion Z1 or the third resistor portion Z3 may be a temperature sensor, or the first resistor portion Z1 and the third resistor portion Z3 may be a temperature sensor in combination.

Figure 10A:
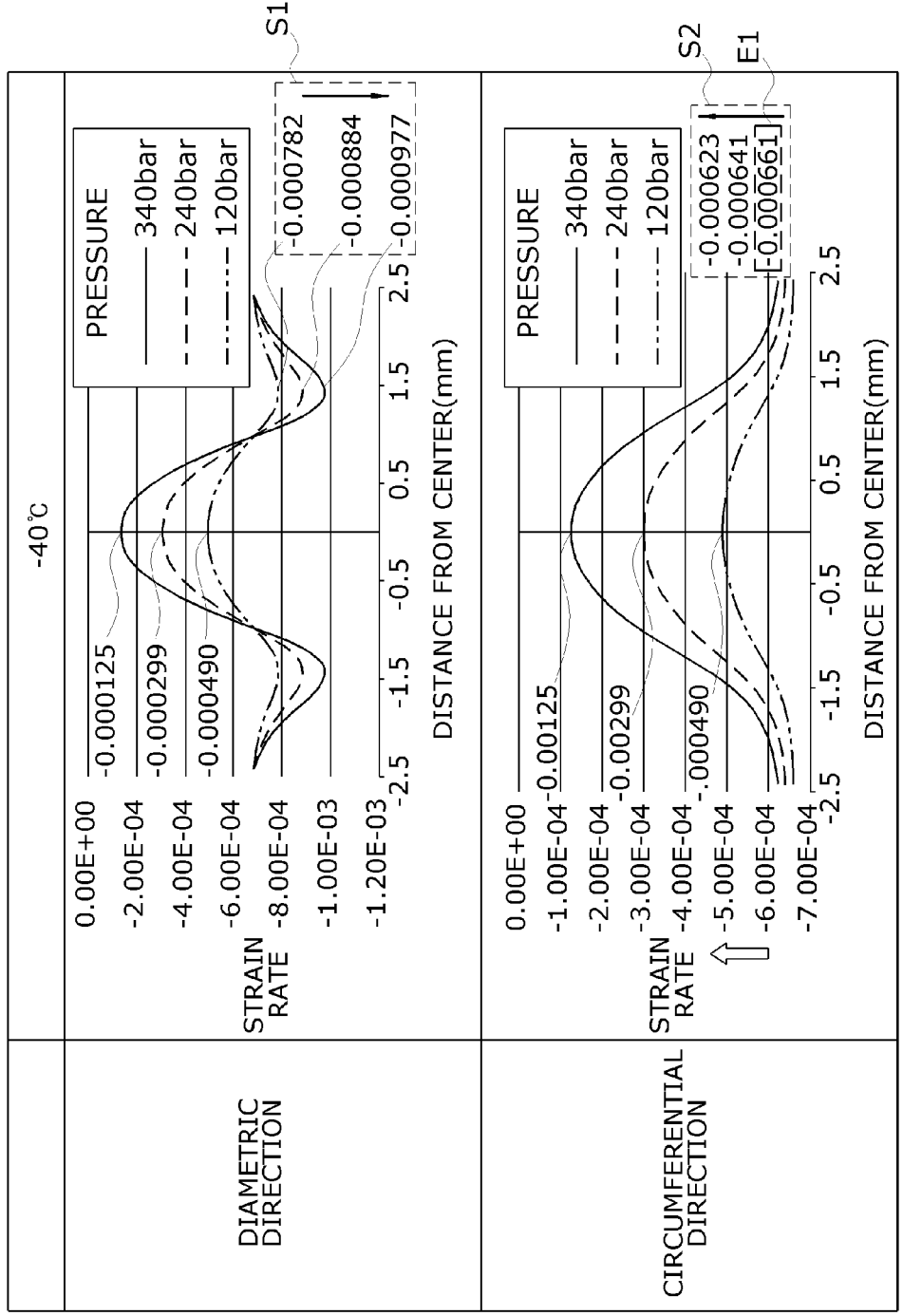
FIGS. 10A to 10C are exemplary comparative graphs showing diametric direction and circumferential direction strain rates of a pressure sensor according to an exemplary embodiment of the present disclosure.
Figure 10B:
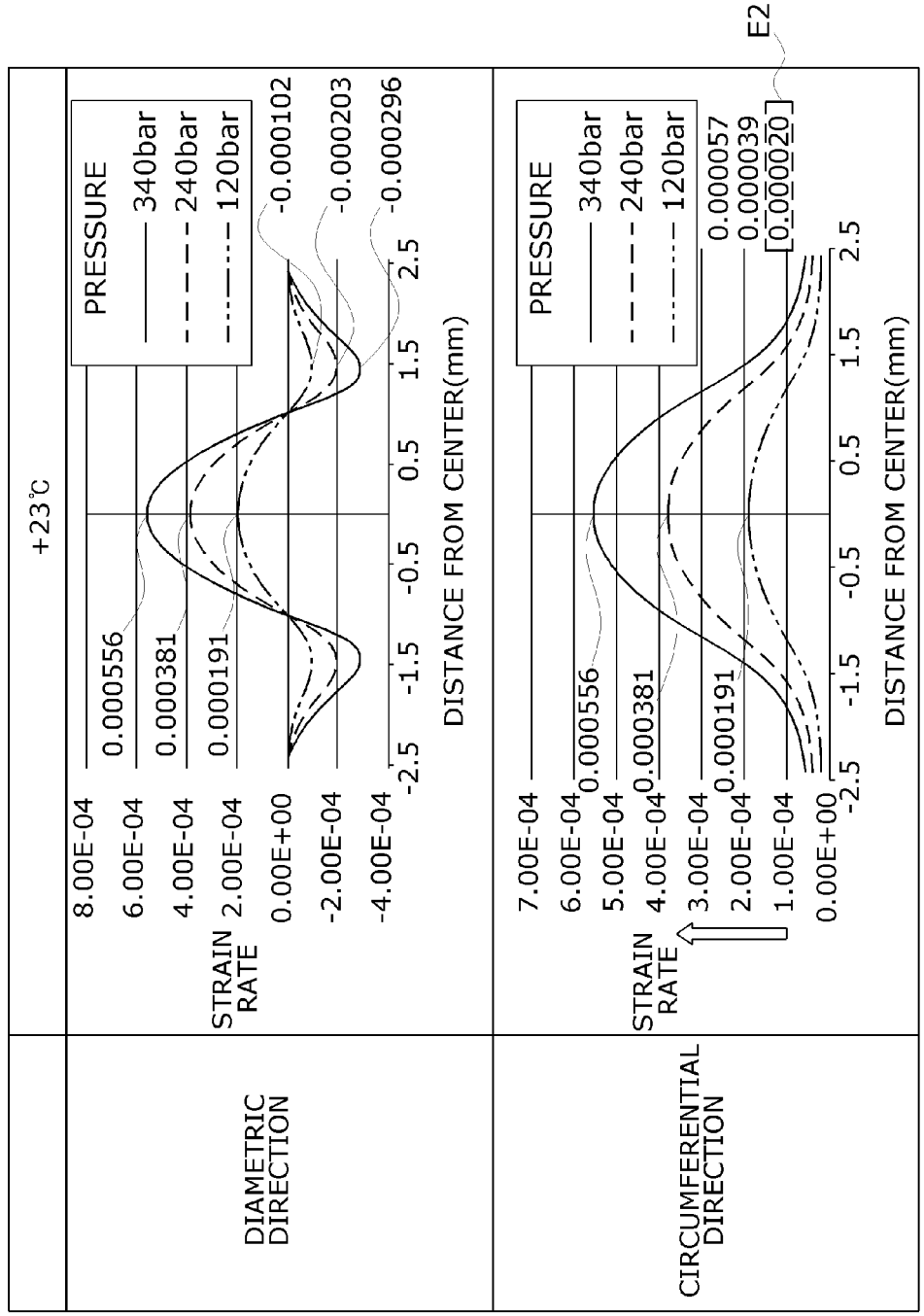
Figure 10C:
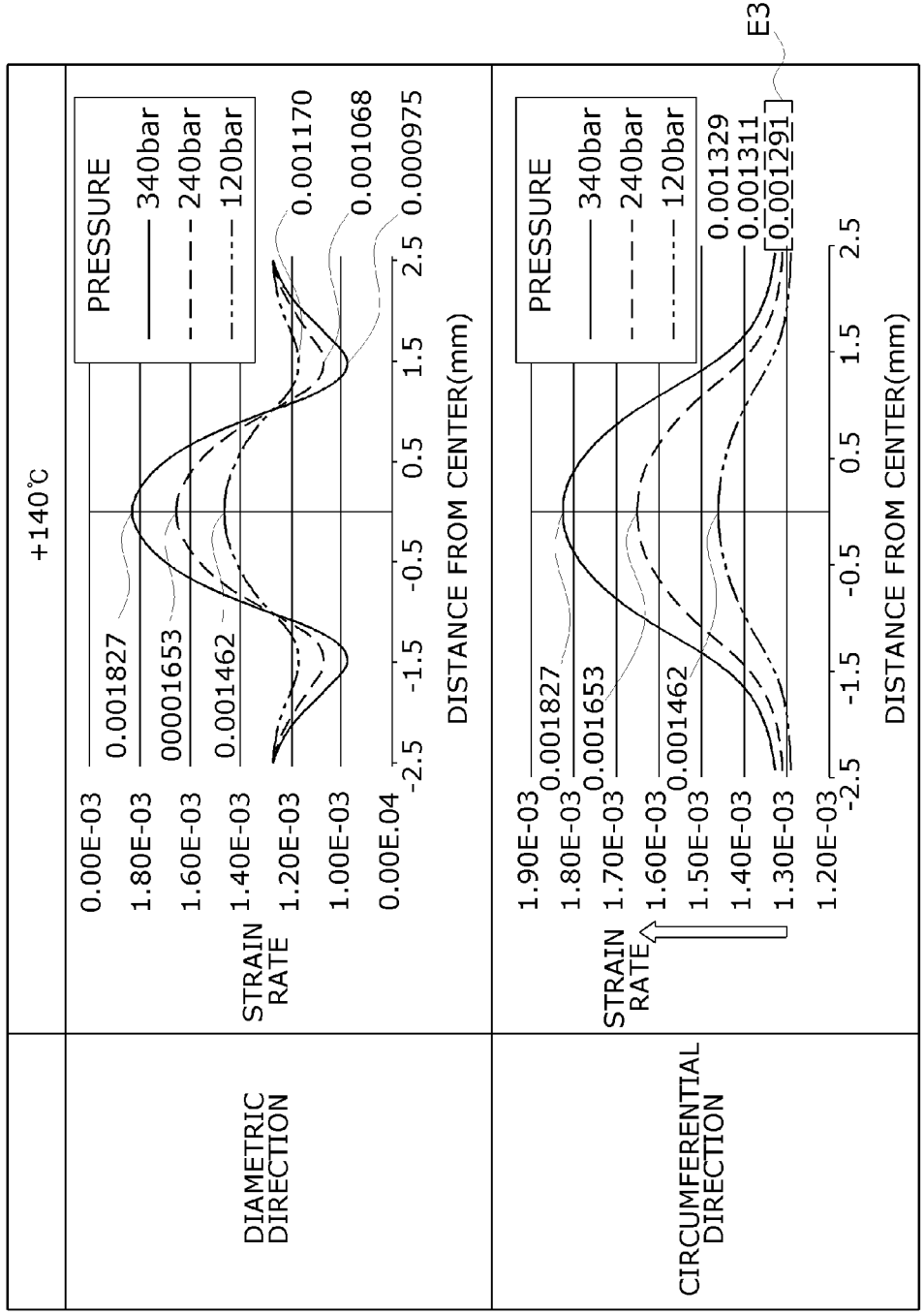

FIGS. 10A to 10C are exemplary comparative graphs showing diametric direction and circumferential direction strain rates of a pressure sensor. Referring to strain rate values E1, E2, and E3 of the lower graph (e.g., a temperature of −40° C.) of FIG. 10A to the lower graph (e.g., a temperature of +140° C.) of FIG. 10C, the pressure-measuring resistors may be a temperature sensor. In other words, when a temperature rises a strain rate increases and a resistance is reduced and the exemplary embodiment may be used as a temperature sensor.

Referring to a second broken-line boxed region S2 of the lower graph (e.g., a temperature of −40° C.) of FIG. 10A, when a pressure increases along the circumferential direction, a strain rate value also increases, and a resistance value may be reduced. In other words, a strain rate value may vary based on pressure. Conversely, referring to a first broken-line box 51 of the upper graph (e.g., a temperature of −40° C.) of FIG. 10A, when a pressure increases along the diametric direction, a strain rate value is reduced, and a resistance value may be increased. In other words, the first broken-line boxed region 51 shows backward directivity (e.g., an arrow direction, corresponding to a direction in which a resistance value varies with an increase in pressure, is downward in the first broken-line boxed region). In particular, pressure-specific strain rate values at the same temperature may be reduced (e.g., an increase in resistance value) along the diametric direction in the compression section of the diaphragm with an increase in pressure.

However, the second broken line box S2 shows forward directivity (e.g., an arrow direction, corresponding to a direction in which a resistance value varies with an increase in pressure, is upward in the second broken line box) and pressure-specific strain rate values at the same temperature may be increased (e.g., a decrease in resistance value) along the circumferential direction in the compression section of the diaphragm with an increase in pressure. Therefore, the aforementioned resistance-change length ratio that corresponds to a direction-specific extension length may be calculated to implement a precise sensor, eliminate a resistance change caused by a pressure-specific temperature change, and eliminate a resistance change of a resistor (e.g., any one of the first resistor portion Z1, the third resistor portion Z3, and the temperature-measuring resistor 300) in the compression section of the diaphragm (e.g., to offset the backward directivity and the forward directivity against each other).

Figure 11:
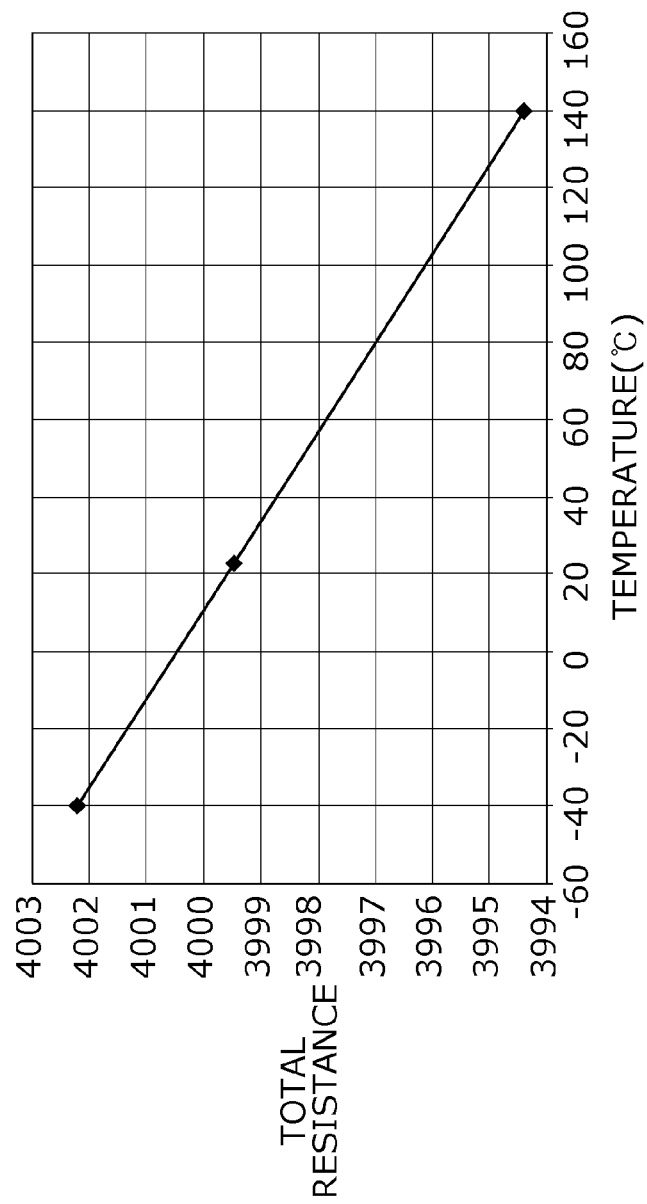
FIG. 11 is an exemplary resistance-temperature graph when the sensor element according to the exemplary embodiment of the present disclosure is used as a temperature sensor.

FIG. 11 is an exemplary resistance-temperature graph when the sensor element according to the exemplary embodiment of the present disclosure is used as a temperature sensor. Referring to FIG. 11, individual resistance values of the four pressure-measuring resistors of the diaphragm may be linearly calculated based on strain from 1000 ohm. A temperature relative to a total resistance may be linearly calculated at a pressure of 350 bar as an example analytical condition. In other words, the sensor element of the exemplary embodiment shows a linear resistance change based on a temperature change and may be used as a temperature sensor. In particular, the sensor element may be used as a part that has a high temperature response rate and a high resolution and may result in a cost reduction.

While a related art requires an additional internal temperature sensor or temperature module (not shown) in an application-specific integrated circuit (ASIC), the exemplary embodiment makes it possible to eliminate the additional internal temperature sensor or temperature module to reduce the cost of a sensor product. In particular, while an internal temperature sensor of an existing ASIC may cause signal fluctuations, the exemplary embodiment may relatively reduce signal fluctuations due to a high temperature response rate compared to a the internal temperature sensor of the ASIC. Furthermore, the sensor element of the exemplary embodiment may have a higher resolution than a pressure sensor or a compound temperature and pressure sensor according to a related art.

Figure 12:
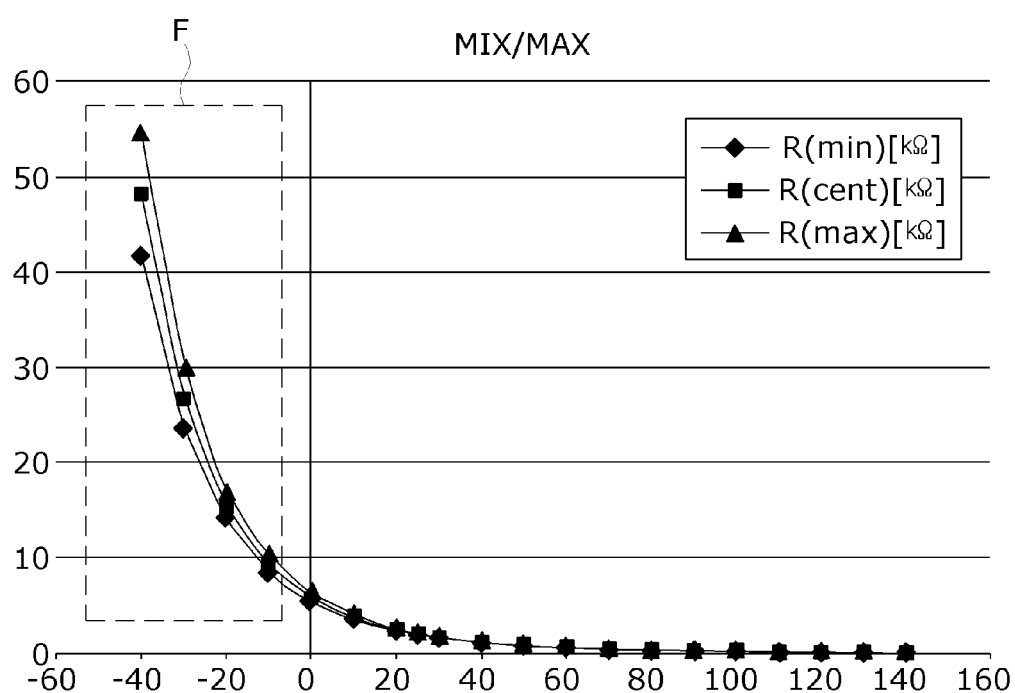
FIG. 12 is an exemplary resistance-temperature graph when a sensor element according to a related art, which is a comparative example of the present disclosure, is used as a temperature sensor according to an exemplary embodiment of the present disclosure.
Figure 13:
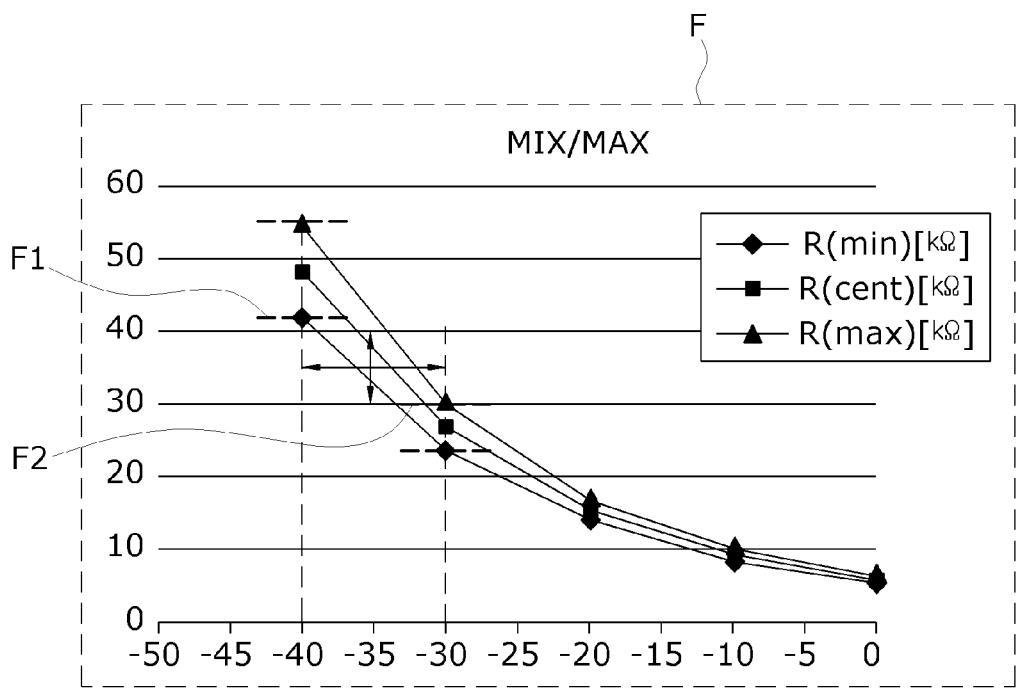
FIG. 13 is an exemplary enlarged view of a broken-line rectangle region F of FIG. 12 according to an exemplary embodiment of the present disclosure.

FIG. 12 is an exemplary resistance-temperature graph when a sensor element according to a related art, which is a comparative example of the present disclosure, is used as a temperature sensor. FIG. 13 is an exemplary enlarged view of a broken-line rectangle region F of FIG. 12. Referring to FIG. 12, non-linear output values are detected from a compound temperature and pressure sensor in which a sensor element according to a related art is installed as a comparative example, unlike the exemplary embodiment. Additionally, referring to FIG. 13, when a margin between a minimum value F1 of −40° C. and a maximum value F2 of −30° C. is minimized, the compound temperature and pressure sensor may have a lower resolution.

FIGS. 14A to 14B is an exemplary data table showing results of extracting resistance values according to direction from a diaphragm of a sensor element in order to describe a resistance-change length ratio of the present disclosure. The aforementioned strain rate values are represented as resistance values according to sensor product type in FIGS. 14A to 14B. A difference in resistance values caused by a pressure-specific temperature change may be defined according to direction as a temperature deviation G2 or G3, and a difference in resistance value caused by a pressure change at the same temperature may be defined according to direction as a compression deviation G1 or G4.

For example, the compression deviation G1 of the circumferential direction θ may denote a value N3 (e.g., −0.038) calculated by subtracting a resistance value N2 (e.g., 1000.661) of the compression section at the lowest pressure from a resistance value N1 (e.g., 1000.623) of the compression section at the highest pressure at the same temperature. The temperature deviation G2 of the circumferential direction θ may denote a value (e.g., 1.952) calculated by subtracting a resistance value (e.g., 998.709) of the compression section at the highest temperature from a resistance value (e.g., 1000.661) of the compression section at the lowest temperature at the same pressure.

The temperature deviation G3 of the diametric direction R may denote a value (e.g., 1.952) calculated by subtracting a resistance value (e.g., 998.830) of the compression section at the highest temperature from a resistance value (e.g., 1000.782) of the compression section at the lowest temperature at the same pressure. For example, the temperature deviation G2 of the circumferential direction θ may be the same as the temperature deviation G3 of the diametric direction R. The compression deviation G4 of the diametric direction R may denote the value M3 (e.g., 0.195) calculated by subtracting a resistance value M2 (e.g., 1000.782) of the compression section at the lowest pressure from a resistance value M1 (e.g., 1000.977) of the compression section at the highest pressure at the same temperature. In particular, referring to the temperature deviation G2 of the circumferential direction θ, a resistance change caused by a temperature change may be relatively large at the same pressure (120 bar, 240 bar, and 250 bar).

Referring to FIGS. 10A to 10C and FIGS. 14A to 14B together, it is possible to solve the problem by offsetting forward directivity of the diagonal direction R shown in the first broken-line boxed region S1 against backward directivity shown in the second broken line-boxed region S2. In other words, a compressive strain amount (e.g., a resistance value) of the diametric direction R and a tensile strain amount (e.g., a resistance value) of the circumferential direction θ offset each other and sum to zero. In particular, the above-described resistance-change length ratio and resistance-change offset multiple are provided in the present disclosure. The resistance-change offset multiple may be 5.13, the reciprocal of −5.13158 (e.g., rounded off to the second digit after the decimal point) that is a value calculated by dividing 0.195, which is the value M3 of the compression deviation G4 of the diametric direction R, by −0.038, which is the value N3 of the compression deviation G1 of the circumferential direction θ, under the same temperature condition.

For example, in relation to a resistance-change length ratio of the temperature-measuring resistor 300, when the second extension length L of the temperature-measuring resistor 300 in the circumferential direction θ is extended by the resistance-change offset multiple (e.g., 5.13) relative to the sum (W1+W2) of the first extension length W1 and the third extension length W2 in the diametric direction R as shown in FIG. 5, a compressive strain amount in the diametric direction R and a tensile strain amount in the circumferential direction θ sum to zero. Therefore, unlike in a related art, it is unnecessary to provide or use an additional internal temperature sensor in an ASIC. Accordingly, a more precise measurement of a temperature may be achieved because resistance changes offset each other based on a temperature change when the pressure-measuring resistors 200 according to the exemplary embodiment are used to measure a pressure.

Figure 15:
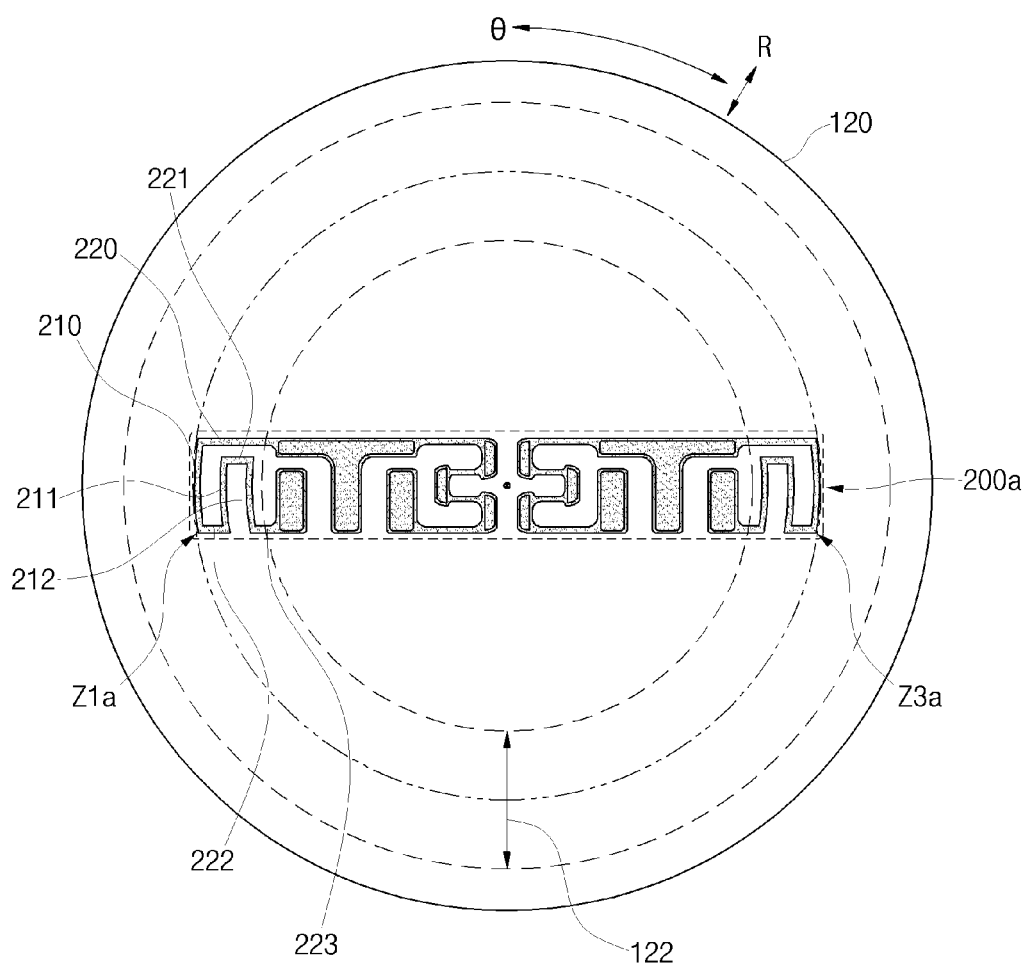
FIG. 15 is an exemplary top-down view illustrating a resistor pattern of a diaphragm of a sensor element according to an application example of an exemplary embodiment of the present disclosure.
Figure 16:
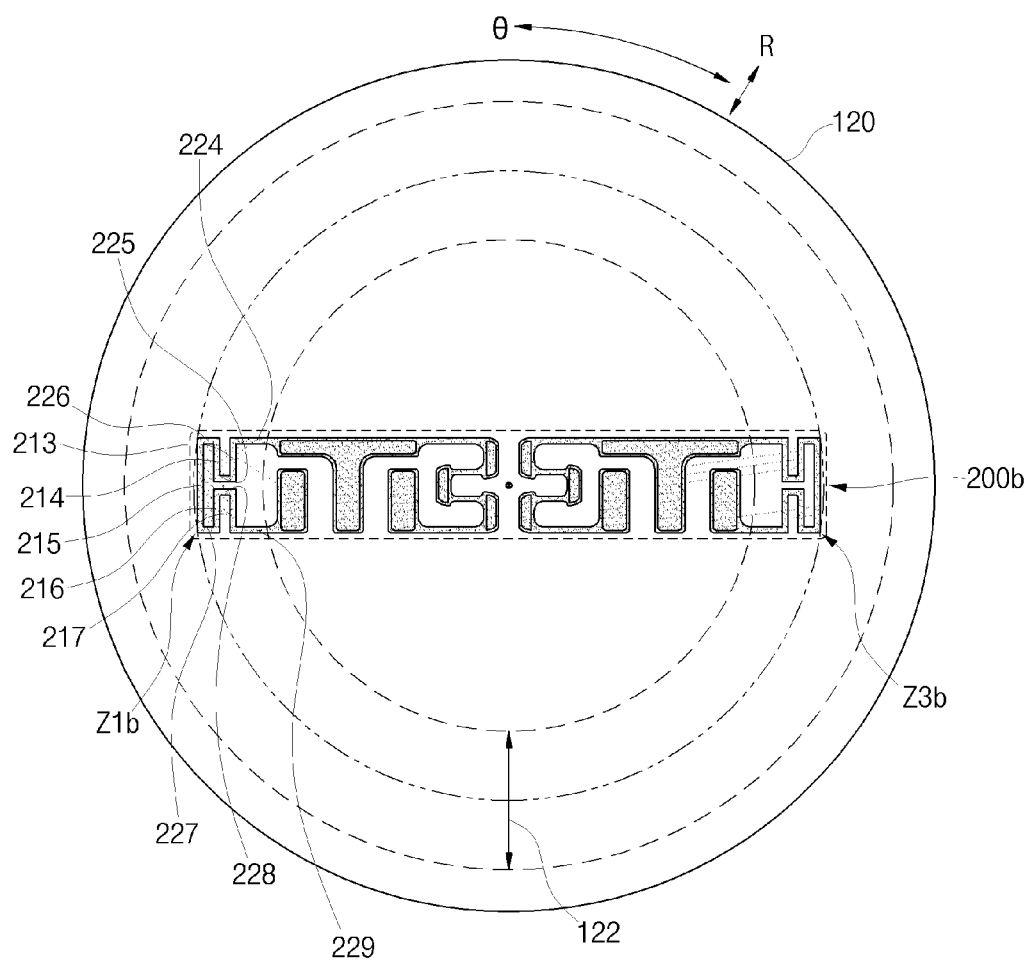
FIG. 16 is an exemplary top-down view illustrating a resistor pattern of a diaphragm of a sensor element according to another application example of an exemplary embodiment of the present disclosure.

FIG. 15 is an exemplary top-down view illustrating a resistor pattern of a diaphragm of a sensor element according to an application example of the present disclosure. FIG. 16 is an exemplary top-down view illustrating a resistor pattern of a diaphragm of a sensor element according to another application example of the present disclosure. Referring to FIGS. 15 and 16, pressure-measuring resistors 200a and 200b of sensor elements according to application examples may have resistor patterns in a shape or a form that corresponds to the aforementioned resistance-change length ratio. In particular, the sensor elements according to the application examples may not require the above-described temperature-measuring resistor 300 of FIG. 5, and a first resistor portion Z1a or a third resistor portion Z3a may perform a temperature compensation instead of the temperature-measuring resistor 300.

According to the pressure-measuring resistors 200a of FIG. 15, the first resistor portion Z1a and the third resistor portion Z3a of the pressure-measuring resistors 200a disposed in the compression section 122 may have an arc shape or a straight line shape. For example, the first resistor portion Z1a or the third resistor portion Z3a may include a plurality of arcs 210, 211, and 212 individually disposed along the circumferential direction θ of the diaphragm 120 and a plurality of straight lines 220, 221, 222, and 223 disposed along the diametric direction R of the diaphragm 120. The sum of lengths of the plurality of arcs 210, 211, and 212 may be equal to a product of a resistance-change offset multiple and the sum of lengths of the plurality of straight lines 220, 221, 222, and 223.

Additionally, according to the pressure-measuring resistors 200b of FIG. 16, a first resistor portion Z1b and the third resistor portion Z3b of the pressure-measuring resistors 200b disposed in the compression section 122 may have a straight line shape or a meander shape. For example, the first resistor portion Z1a or the third resistor portion Z3a may include a plurality of first straight lines 213, 214, 215, 216, and 217 individually disposed along a direction similar to the circumferential direction θ of the diaphragm 120 (e.g., a direction perpendicular to the diametric direction R and directly connecting two points on an arc of the maximum compression boundary in the circumferential direction θ), and a plurality of second straight lines 224, 225, 226, 227, 228, and 229 disposed along the diametric direction R of the diaphragm 210. The sum of lengths of the plurality of first straight lines 213, 214, 215, 216, and 217 may be equal to a product of a resistance-change offset multiple and the sum of lengths of the plurality of second straight lines 224, 225, 226, 227, 228, and 229.

A sensor element according to an exemplary embodiment of the present disclosure may eliminate a pressure-specific resistance change caused by a temperature change from a diaphragm thereof by providing a resistance-change length ratio. For example, an extension length in a diametric direction and an extension length in a circumferential direction of each of a temperature-measuring resistor and external pressure-measuring resistors may be defined based on the resistance-change length ratio. Therefore, without providing an additional temperature compensation module in a circuit used for configuring a sensor, a pressure and a temperature may be more precisely measured using the sensor element.

A sensor element according to an exemplary embodiment of the present disclosure may be configured to output a total resistance value, which is an output value of a sensor, having linearity that is inversely proportional to a temperature change and having an improved resolution and an improved measurement convenience. Linearity denotes that it is possible to more precisely measure a temperature between two measured values based on the two measured values, and measurement convenience may be achieved due to linearity. Compared to existing sensor elements, a sensor element according to an exemplary embodiment of the present disclosure may have relatively high measurement precision due to linearity of a measured temperature value, may improve mass-production of products that may be used as a pressure sensor and a temperature sensor, and may be reduce production cost of the sensor element.

The above description of the present disclosure is exemplary, and those of ordinary skill in the art should appreciate that the present disclosure may be easily carried out in other detailed forms without changing the technical spirit or essential characteristics of the present disclosure. Therefore, exemplary embodiments of the present disclosure describe rather than limit the technical spirit of the present disclosure, and the scope of the present disclosure is not limited by these exemplary embodiments. It should be noted that the scope of the present disclosure is defined by the claims rather than the description of the present disclosure, and the meanings and ranges of the claims and all modifications derived from the concept of equivalents thereof fall within the scope of the present disclosure.

What is claimed is:

1. A sensor element, comprising:
   an element body disposed in a sensor body that is configured to measure a temperature and a pressure and having a diaphragm deformed based on the temperature or the pressure; and
   pressure-measuring resistors including a second resistor portion and a fourth resistor portion disposed along a diametric direction with respect to a center of an upper surface of the diaphragm and in an extension section on the upper surface of the diaphragm and including a first resistor portion and a third resistor portion disposed outside the second resistor portion or the fourth resistor portion in a compression section on the upper surface of the diaphragm to eliminate a resistance change caused by a pressure-specific temperature change,
   wherein the first resistor portion and the third resistor portion of the pressure-measuring resistors include a plurality of arcs individually disposed along a circumferential direction of the diaphragm and a plurality of straight lines disposed along a diametric direction of the diaphragm,
   wherein the plurality of arcs and the plurality of straight lines are formed to allow a sum of lengths of the plurality of arcs to be equal to a product of a resistance-change offset multiple and a sum of lengths of the plurality of straight lines,
   wherein the resistance-change offset multiple is selected to minimize a sum of a compressive strain amount in the diametric direction and a tensile strain amount in the circumferential direction,
   wherein the element body comprises:
   a hollow portion open at a central part of a lower surface of the element body and having a pressure applied thereto;
   a step formed on a circumferential surface of a cylindrical wall that limits the hollow portion and is formed to correspond to a portion protruding from an outer side of the hollow portion, and
   wherein the diaphragm is integrally formed with the cylindrical wall to close an upper end of the cylindrical wall,
   wherein the step and a circumferential surface of the element body are formed as a rigid body,
   wherein the first and second resistor portions are symmetrical with the third and fourth resistor portions relative to the center of the top of the diaphragm,
   wherein the element body includes the extension section formed on the upper surface of the diaphragm with respect to the center and extending along a circumferential direction of the diaphragm between the center and a compression start boundary at which a strain of the diaphragm in a diametric direction is configured to switch from an extension state to a compression state,
   wherein the compression section that is a circular band region lying outside the extension section on the upper surface of the diaphragm and extending along the circumferential direction between the compression start boundary and a compression end boundary at which a strain of the diaphragm in the diametric direction is configured to switch from the compression state to a strainless state,
   wherein a circumferential section is disposed between the compression section and an exterior of the diaphragm, and a maximum compression boundary is formed along the circumferential direction between the compression end boundary and the compression start boundary,
   wherein the element body includes a temperature-measuring resistor formed in the compression section on the upper surface of the diaphragm,
   wherein a strain of the pressure-measuring resistors increases based on a temperature increase of the diaphragm to reduce a resistance value of the pressure-measuring resistors,
   wherein the temperature-measuring resistor performs a temperature compensation to maintain the resistance value independent of the pressure,
   wherein the temperature-measuring resistor has a resistor pattern that corresponds to a resistance-change length ratio to enable the temperature-measuring resistor to react to temperature via offsetting of a resistance change caused by a pressure change,
   wherein the resistor pattern of the temperature-measuring resistor comprises:
   a first extension that extends by a first extension length along the diametric direction from a pattern start point in the compression section on the upper surface of the diaphragm to the maximum compression boundary;
   a second extension bent along the circumferential direction at an end of the first extension and that extends by a second extension length along the maximum compression boundary; and
   a third extension that extends by a third extension length along the diametric direction from an end of the second extension to a pattern end point, and
   wherein each of the first extension, the second extension, and the third extension consists of one.

2. The sensor element of claim 1, wherein the resistance-change length ratio of the temperature-measuring resistor is a ratio that equalizes the second extension length and a product of the resistance-change offset multiple and a sum of the first extension length and the third extension length, and is derived from an analytical experiment that determines a correlation between a pressure change and strain rate changes in the diameter direction and circumferential direction in the diaphragm, and wherein an amount of compressive strain in the diametric direction and an amount of tensile strain in the circumferential direction offset each other and sum to zero.

3. The sensor element of claim 2, wherein the resistor pattern of the temperature-measuring resistor has an arc shape or a straight line shape.

4. The sensor element of claim 1, wherein the element body includes a material selected from the group consisting of a metallic material, an alloy material, a semiconductor material that varies in resistance when a load of temperature or pressure which is a stress applied through a piezoresistive effect, and a composite material obtained by combining the semiconductor material with the metallic material or the alloy material.

5. The sensor element of claim 1, wherein the pressure-measuring resistors include a plurality of connection lead terminals disposed on the upper surface of the diaphragm to form an electrical connection of the first to fourth resistor portions.

* * * * *